US010762790B2

United States Patent
Yanagida et al.

(10) Patent No.: US 10,762,790 B2
(45) Date of Patent: Sep. 1, 2020

(54) PARKING ASSISTANCE SERVICE MANAGEMENT DEVICE, PARKING ASSISTANCE SERVICE USE SUPPORT METHOD, PARKING ASSISTANCE SERVICE MANAGEMENT METHOD, AND NON-TRANSITORY COMPUTER-READABLE STORAGE MEDIUM

(71) Applicant: TOYOTA JIDOSHA KABUSHIKI KAISHA, Toyota-shi (JP)

(72) Inventors: Tohru Yanagida, Nagoya (JP); Chikage Kubo, Chofu (JP); Ai Fujimura, Toyota (JP); Shunsuke Noda, Kakamigahara (JP); Satoshi Usui, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/225,414

(22) Filed: Dec. 19, 2018

(65) Prior Publication Data
US 2019/0197905 A1 Jun. 27, 2019

(30) Foreign Application Priority Data
Dec. 21, 2017 (JP) ................................ 2017-244920

(51) Int. Cl.
*G08G 1/00* (2006.01)
*H04W 4/024* (2018.01)
(Continued)

(52) U.S. Cl.
CPC .............. *G08G 1/207* (2013.01); *G06Q 10/02* (2013.01); *G06Q 50/30* (2013.01); *G08G 1/14* (2013.01);
(Continued)

(58) Field of Classification Search
CPC .......... G08G 1/207; G08G 1/14; G08G 1/144; G08G 1/148; H04W 4/024; G06Q 10/02; G06Q 50/30
(Continued)

(56) References Cited

U.S. PATENT DOCUMENTS 6,392,565 B1 * 5/2002 Brown ................. B60R 25/102
340/988
6,611,229 B2 * 8/2003 Muramatsu ............. B60R 25/00
342/357.57
(Continued)

FOREIGN PATENT DOCUMENTS

JP        2006-209429        8/2006

*Primary Examiner* — Ojiako K Nwugo
(74) *Attorney, Agent, or Firm* — Oblon, McClelland, Maier & Neustadt, L.L.P.

(57) ABSTRACT

A parking assistance service management device that manages a parking assistance service in which an agent provides parking assistance for a vehicle of a service user includes a processor configured to acquire position information on the vehicle from a terminal of the agent driving the vehicle to a parking lot on behalf of the service user, and to generate, based on the position information, information indicating a path along which the vehicle has traveled to the parking lot from a delivery place at which the vehicle is delivered to the agent, and a transmission unit configured to transmit the information indicating the path to a terminal of the service user.

7 Claims, 14 Drawing Sheets

(51) Int. Cl.
  *H04W 4/029* (2018.01)
  *G08G 1/14* (2006.01)
  *G06Q 50/30* (2012.01)
  *G06Q 10/02* (2012.01)

(52) U.S. Cl.
  CPC ............ *G08G 1/144* (2013.01); *G08G 1/148* (2013.01); *H04W 4/024* (2018.02); *H04W 4/029* (2018.02)

(58) Field of Classification Search
  USPC ..................................................... 340/932.2
  See application file for complete search history.

(56) References Cited

U.S. PATENT DOCUMENTS

| | | | |
|---|---|---|---|
| 6,819,258 B1* | 11/2004 | Brown | G08B 21/0202 340/10.4 |
| 7,768,393 B2* | 8/2010 | Nigam | G08G 1/205 340/539.13 |
| 2009/0091477 A1* | 4/2009 | McCall | G01S 19/42 340/990 |
| 2010/0217518 A1* | 8/2010 | Chang | G01C 21/3688 701/533 |
| 2011/0161138 A1* | 6/2011 | Keaveny | G06Q 10/06 705/7.38 |
| 2011/0161380 A1* | 6/2011 | Keaveny | G06Q 10/06 707/812 |
| 2011/0320256 A1* | 12/2011 | Florucci | G07B 15/02 705/14.33 |
| 2012/0226391 A1* | 9/2012 | Fryer | G08G 1/202 701/1 |
| 2015/0130641 A1* | 5/2015 | Rahman | G08G 1/142 340/932.2 |
| 2016/0014220 A1* | 1/2016 | Kim | G01C 21/3438 709/202 |
| 2016/0284217 A1* | 9/2016 | Lee | B62D 15/0285 |
| 2017/0320518 A1* | 11/2017 | Lavoie | B62D 13/06 |
| 2018/0053237 A1* | 2/2018 | Hayes | G08G 1/143 |
| 2018/0065625 A1* | 3/2018 | Tijerina | G05D 1/0055 |
| 2018/0089631 A1* | 3/2018 | Baker, Sr. | G06Q 10/1093 |
| 2018/0118100 A1* | 5/2018 | Kjaer-Lohse | B60Q 1/346 |
| 2019/0082377 A1* | 3/2019 | Silver | B60W 50/14 |

* cited by examiner

FIG. 4

USER DB　　　416

| | PERSONAL INFORMATION | | | VEHICLE INFORMATION | | | |
|---|---|---|---|---|---|---|---|
| USER ID | NAME | CONTACT ADDRESS | USER TERMINAL INFORMATION | VEHICLE TYPE | VEHICLE NUMBER | COLOR | KEY UNIT INFORMATION |
| | | | | | | | |
| | | | | | | | |
| | | | | | | | |
| | | | | | | | |
| | | | | | | | |

| SERVICE USE-RELATED INFORMATION | | | ASSOCIATION |
|---|---|---|---|
| USE DATE AND TIME | DELIVERY PLACE | DESTINATION | AGENT ID |
| | | | |
| | | | |
| | | | |
| | | | |
| | | | |

FIG. 5

AGENT DB　　　417

| | PERSONAL INFORMATION | | | STATUS INFORMATION | | | | ASSOCIATION |
|---|---|---|---|---|---|---|---|---|
| AGENT ID | NAME | CONTACT ADDRESS | AGENT TERMINAL INFORMATION | RESPONDABILITY | LOCATION AREA | CURRENT POSITION | MOVEMENT SPEED | USER ID |
| | | | | | | | | |
| | | | | | | | | |
| | | | | | | | | |
| | | | | | | | | |
| | | | | | | | | |

PARKING ASSISTANCE SERVICE MANAGEMENT DEVICE, PARKING ASSISTANCE SERVICE USE SUPPORT METHOD, PARKING ASSISTANCE SERVICE MANAGEMENT METHOD, AND NON-TRANSITORY COMPUTER-READABLE STORAGE MEDIUM

INCORPORATION BY REFERENCE

The disclosure of Japanese Patent Application No. 2017-244920 filed on Dec. 21, 2017 including the specification, drawings and abstract is incorporated herein by reference in its entirety.

BACKGROUND

1. Technical Field

The present disclosure relates to a parking assistance service management device, a parking assistance service use support method, a parking assistance service management method, and a non-transitory computer-readable storage medium storing a program managing the parking assistance service.

2. Description of Related Art

In a case where a driver visits a predetermined destination (such as a store, a shopping mall, and an event venue) by driving a vehicle for shopping, event participation, event appreciation, and so on, a parking lot at the destination may be full. Then, the driver has to stand by in a parking queue, while driving the vehicle, until an empty parking space (hereinafter, referred to as an "empty space") becomes available. In some cases, the empty space cannot be found with ease even if the driver searches for the empty space by slowly driving in the parking lot. Sometimes, another driver parks his or her vehicle ahead of the driver with the driver overlooking the empty space. In some cases, the driver may have to give up on the parking lot at the destination and park his or her vehicle at another parking lot near the destination. Not a few drivers regard the above-described parking lot and space search and waiting for an available empty space as a waste of time.

In the related art, Japanese Unexamined Patent Application Publication No. 2006-209429 (JP 2006-209429 A) discloses a parking guidance navigation system guiding a vehicle to an empty space in a case where, for example, the empty space becomes available during parking space search for the vehicle.

SUMMARY

In the related art, it is possible to shorten the time taken until parking after the empty space becomes available. However, a driver should continue driving the vehicle until parking is completed by the driver moving the vehicle to the empty space after the empty space becomes available. Conceivable in this regard is a parking assistance service for vehicle parking assistance. A user who uses the service stops his or her vehicle in a delivery place. An agent goes to the vehicle delivery place, temporarily borrows the vehicle, and parks the vehicle by moving the vehicle to a parking lot.

The following problems arise in promoting and popularizing the parking assistance service. For example, when it is unclear what type of path an agent driving the vehicle on behalf of a service user used to reach the parking lot, the service user may be concerned over wasting of the fuel and electric power of the vehicle by the agent. This may hinder the popularization of parking assistance service.

The disclosure provides a parking assistance service management device, a parking assistance service use support method, a parking assistance service management method, and a non-transitory computer-readable storage medium storing a program managing the parking assistance service allowing a service user to feel at ease with a parking assistance service.

The gist of the disclosure lies in acquiring position information on a vehicle from a terminal of the agent and supplying a service user's terminal with information generated based on the position information and indicating a path from a delivery place at which the vehicle is delivered to the agent to a parking lot in a parking assistance service in which the agent provides parking assistance for the service user's vehicle.

A first aspect of the disclosure relates to a parking assistance service management device, and the device manages a parking assistance service in which an agent provides parking assistance for a vehicle of a service user. The parking assistance service management device includes a processor configured to acquire position information on the vehicle from a terminal of the agent driving the vehicle to a parking lot on behalf of the service user, and the processor being configured to generate, based on the position information, information indicating a path along which the vehicle has traveled to the parking lot from a delivery place at which the vehicle is delivered to the agent, and a transmission unit configured to transmit the information indicating the path to a terminal of the service user.

With the parking assistance service management device of the first aspect of the disclosure, the path information indicating the path that the agent has used to drive the vehicle from the delivery place to the parking lot is generated and transmitted to the service user's terminal. By referring to the path information, the service user can be aware of the path along which the vehicle has traveled by the driving agent and confirm that no fuel has been wasted or the vehicle has not traveled along a path unnecessary for the vehicle travel to the parking lot. As a result, the service user can feel at ease and is likely to use the service again. In this specification, the "service user" includes both a person planning to use the parking assistance service and a person actually using the service by concluding a contract.

In the parking assistance service management device according to the first aspect of the disclosure, the information indicating the path may include information indicating a road and an intersection through which the vehicle has traveled. The information indicating the road and the intersection may be text information or graphic information. In the parking assistance service management device according to the first aspect of the disclosure, the information indicating the path may include an image of an outside of the vehicle captured from the vehicle when the vehicle is travelling to the parking lot. In addition, the information indicating the path may be represented in any form insofar as the service user can specify the path along which the vehicle has traveled.

The parking assistance service management device according to the first aspect of the disclosure may further include an evaluation acquisition unit configured to acquire, from the terminal of the service user, information indicating service user's evaluation on the information indicating the path. The service user can answer to the information indicating the path with the evaluation, and thus information required to improve path selection can be obtained and path selection providing relief and satisfaction for the service user can be performed. Also expected from the evaluation is the agent being blocked from following a path deemed useless or unnecessary by the service user.

A second aspect of the disclosure relates to a parking assistance service use support method, and the method is for managing a parking assistance service in which an agent provides parking assistance for a vehicle of a service user. The parking assistance service use support method includes acquiring position information on the vehicle from a terminal of the agent driving the vehicle to a parking lot on behalf of the service user, generating, based on the position information, information indicating a path along which the vehicle has traveled to the parking lot from a delivery place at which the vehicle is delivered to the agent, and transmitting the information indicating the path to a terminal of the service user.

A third aspect of the disclosure relates to a non-transitory computer-readable storage medium storing a program for managing a parking assistance service in which an agent provides parking assistance for a vehicle of a service user. The program causes a computer of a management device that manages the parking assistance service to execute a step of acquiring position information on the vehicle from a terminal of the agent driving the vehicle to a parking lot on behalf of the service user, a step of generating, based on the position information, information indicating a path along which the vehicle has traveled to the parking lot from a delivery place at which the vehicle is delivered to the agent, and a step of transmitting the information indicating the path to a terminal of the service user.

A fourth aspect of the disclosure relates to a non-transitory computer-readable storage medium storing a program for managing a parking assistance service in which an agent provides parking assistance for a vehicle of a service user. The program, in the parking assistance service, causes a computer of a terminal of the service user to execute a step of acquiring information indicating a path along which the vehicle has traveled to a parking lot from a delivery place at which the vehicle is delivered to the agent from a management device that manages the parking assistance service, and a step of presenting the information indicating the path to the service user.

In the non-transitory computer-readable storage medium according to the fourth aspect of the disclosure, the information indicating the path may be presented to the terminal of the service user by means of image display or a voice.

A fifth aspect of the disclosure relates to a parking assistance service management method, and the method is for managing a parking assistance service in which an agent provides parking assistance for a vehicle of a service user. The parking assistance service management method includes acquiring information indicating a path along which a vehicle has traveled to a parking lot from a delivery place at which the vehicle is delivered to the agent from a management device that manages the parking assistance service by a terminal of the service user, and presenting the information indicating the path to the service user by the terminal of the service user.

In the parking assistance service management method according to the fifth aspect of the disclosure, the information indicating the path may be presented to the terminal of the service user by image display or a voice.

According to the aspects of the disclosure, the service user can feel at ease with the parking assistance service.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a table illustrating a data structure example of a user database (user DB);

FIG. 5 is a table illustrating a data structure example of an agent database (agent DB);

DETAILED DESCRIPTION OF EMBODIMENTS

Hereinafter, a management device for a parking assistance service, a use support method for the same, a management method for the same, and a non-transitory computer-readable storage medium storing a program managing the parking assistance service according to an embodiment will be described with reference to accompanying drawings. The configuration of the embodiment is an example, and the disclosure is not limited to the configuration of the embodiment.

System Configuration

Figure 1:
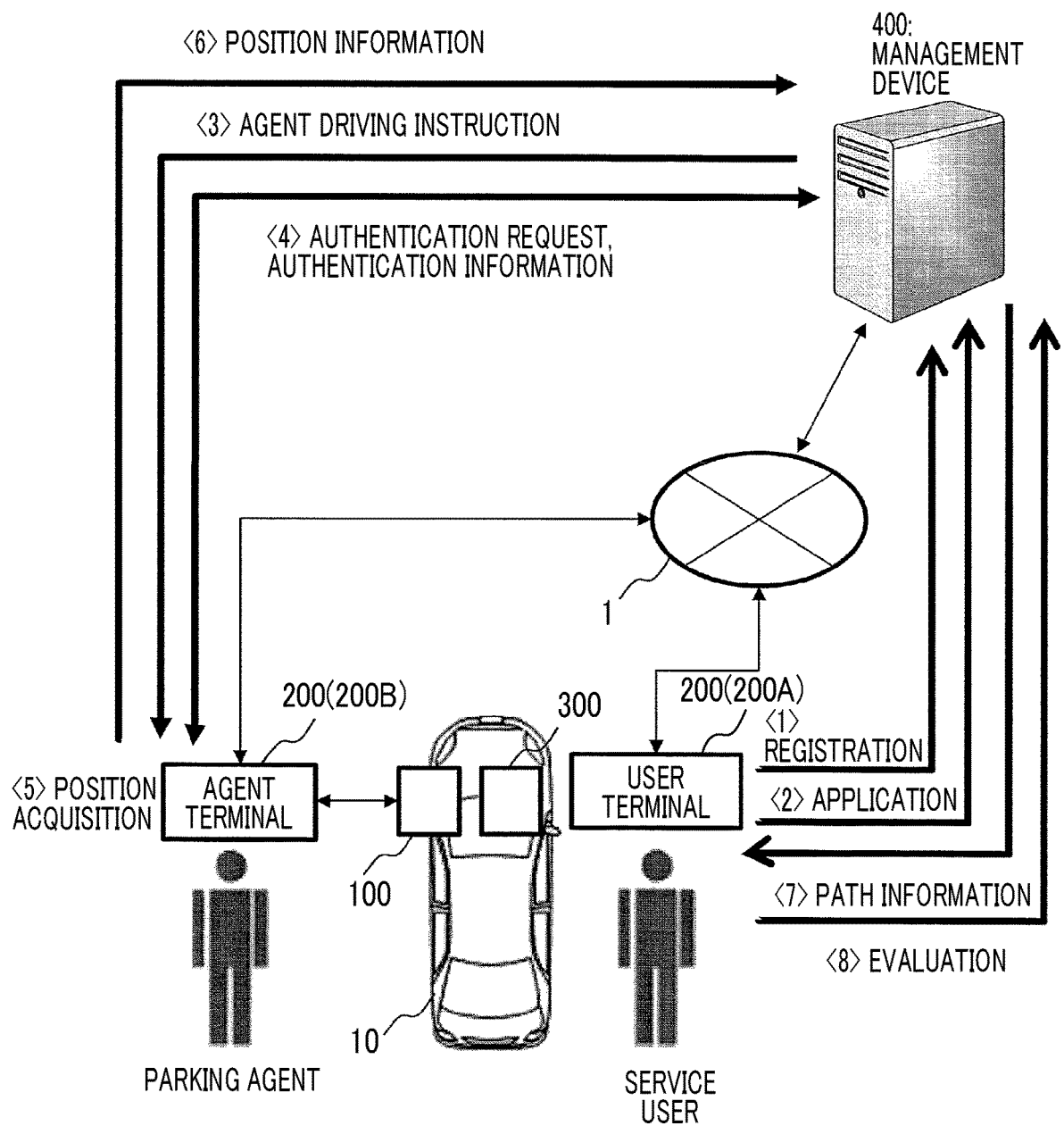
FIG. 1 is a system overview of a parking assistance service according to an embodiment.

FIG. 1 is a system overview of the parking assistance service according to the embodiment. In FIG. 1, a system includes a user terminal 200A, an agent terminal 200B, and a management device 400, which are connected to a network 1. The network 1 is, for example, a communication network such as the Internet, and a wide area network (WAN) or another communication network can be adopted as the network 1. The network 1 may include a cellular network such as the Long Term Evolution (LTE) and a wireless network such as a wireless local area network (LAN: including Wi-Fi).

The user terminal 200A is a terminal device of a service user who uses the parking assistance service and is an example of a "service user terminal". The user terminal 200A may be a smart device such as a feature phone, a smartphone, and a tablet terminal or a portable terminal (portable communication terminal) such as a personal digital assistant (PDA) and a wearable computer.

The agent terminal 200B is a terminal device of an agent who provides parking assistance for a vehicle 10 of the service user and is an example of an "agent terminal". The same portable terminal or the like as the user terminal 200A can be applied as the agent terminal 200B. The user terminal 200A and the agent terminal 200B may be movable and capable of communicating with the management device 400 via the network 1. The user terminal 200A and the agent terminal 200B may also be devices other than the above-described portable terminal insofar as the user terminal 200A and the agent terminal 200B are movable and capable of communicating with the management device 400 via the network 1. As an example, in the present embodiment, a case where the user terminal 200A and the agent terminal 200B are portable terminals will be described. In the following description, a "portable terminal 200" will be used in a case where the user terminal 200A and the agent terminal 200B are mentioned as a portable terminal without distinguishment. In the present embodiment, the agent terminal 200B operates as a path information recording device for the vehicle 10. A car navigation device (not illustrated), a drive recorder device (not illustrated), or the like mounted in the vehicle 10 can be applied as the "path information recording device".

The vehicle 10 is provided with a smart key system including a locking and unlocking device 300 and a key unit 100. The locking and unlocking device 300 gives a unique identification (ID) to a portable device (hereinafter, also referred to as an electronic key) that performs wireless communication with the vehicle 10. The locking and unlocking device 300 allows a door to be unlocked and an engine to be started in a case where the ID obtained by communication with the portable device and the ID pre-registered in the vehicle 10 match each other. The key unit 100 is a device that allows locking and unlocking of the vehicle 10 using the portable terminal 200 instead of the electronic key without entailing remodeling of the vehicle 10. The key unit 100 is placed at a predetermined position in the vehicle 10 (in, for example, a glove compartment). The key unit 100 is supplied with electric power from the battery of the vehicle 10 or a secondary battery. The key unit 100 operates as an electronic key and allows the door to be unlocked, the engine to be started, and so on in a case where vehicle operation enablement data (data for temporarily enabling an operation of the vehicle 10 such as unlocking of the vehicle 10 and engine start) is obtained from the portable terminal 200. The "enablement data" may be data that can be executed by a computer (that is, a program) or data that cannot be executed by a computer. The "enablement data" may be data for proving that one is allowed to operate the vehicle, data for activating a device or a program used for a vehicle operation, the vehicle operation program itself, or data other than the above. As an example, in the present embodiment, a case will be described where the enablement data is authentication information that the key unit 100 uses for authentication of the agent terminal 200B and puts the vehicle 10 into a state where the vehicle 10 can be operated by the agent once the authentication is successful.

The management device 400 is an example of a "parking assistance service management device". The management device 400 is managed by, for example, a parking assistance service administrator (hereinafter, referred to as a service provider). The management device 400 performs, for example, service user information (hereinafter, referred to as user information) and agent information (hereinafter, referred to as agent information) management, user registration processing, service use reception processing, and processing for transmitting, to the user terminal 200A, path information regarding the vehicle 10 received from the agent terminal 200B. The management device 400 operates as an issuing device issuing the authentication information for enabling an operation of the vehicle 10 by using the agent terminal 200B.

Flow of Parking Assistance Service

The flow of the parking assistance service will be described with reference to FIG. 1. A person who wishes to use the parking assistance service accesses the management device 400 by using the user terminal 200A and performs a user registration procedure to become a member of the parking assistance service (hereinafter, also referred to as a service user) (<1> in FIG. 1). Subsequently, in a case where the service user makes a parking assistance service provision request, the service user makes a service use application by operating the user terminal 200A and accessing the management device 400 (<2> in FIG. 1). Exchanged between the management device 400 and the user terminal 200A during the application is information related to an implementation contract for the parking assistance service (date and time of use (date and time of delivery of the vehicle 10), delivery place, service fee, parking fee payment burden, and so on). In this case, the service user may accept a parking lot designated from the service provider side or the service user may entrust parking lot selection to the service provider side. Alternatively, the service provider may present a plurality of candidates for the service user to select one.

Parking agent selection is performed once the parking assistance service implementation contract is established as a result of the exchange. In the present embodiment, the agent selection is automatically performed by the management device 400. The agent selection may be manually performed as well. The management device 400 transmits, to the agent terminal 200B of a selected agent, an agent driving instruction including the delivery place and information on the vehicle 10 (<3> in FIG. 1). The selected agent goes to the delivery place for the vehicle 10 and receives delivery of the vehicle 10 in accordance with the agent driving instruction.

Enablement for an operation of the vehicle 10 by the agent is performed during the delivery. In other words, the agent terminal 200B transmits an authentication request to the management device 400, receives the authentication information for allowing an operation of the vehicle 10 from the management device 400 (<4> in FIG. 1), and supplies the authentication information to the key unit 100 of the vehicle 10. As a result of the authentication information supply, the key unit 100 operates as an electronic key in the smart key system, and the agent can unlock the vehicle 10, start its engine, and drive the vehicle 10. As described above, in the parking assistance service according to the present embodiment, the service user does not have to deliver the electronic key to the agent, and thus the service user may or may not be in the delivery place. The agent drives the vehicle 10, moves the vehicle 10 to the parking lot where the vehicle 10 is to be parked, and parks the vehicle 10. During the movement of the vehicle 10, the agent terminal 200B acquires position information on the movement path of the vehicle 10 (<5> in FIG. 1). Once the parking is completed, the enablement for the operation of the vehicle 10 by the agent is released by, for example, invalidation of the authentication information. The position information acquired by the agent terminal 200B is transmitted to the management device 400 (<6> in FIG. 1). The management device 400 generates information (path information) indicating the path used for the movement from the delivery place for the vehicle 10 to the parking lot based on the position information, and transmits the path information to the user terminal 200A (<7> in FIG. 1). The service user can refer to the path information displayed on the user terminal 200A. The service user refers to the path information and transmits a path information evaluation to the management device 400 (<8> in FIG. 1). The service user goes to the parking lot where the vehicle 10 is parked and retrieves the vehicle 10. Details of each device realizing the parking assistance service will be described below.

Configuration of Portable Terminal

Figure 2:
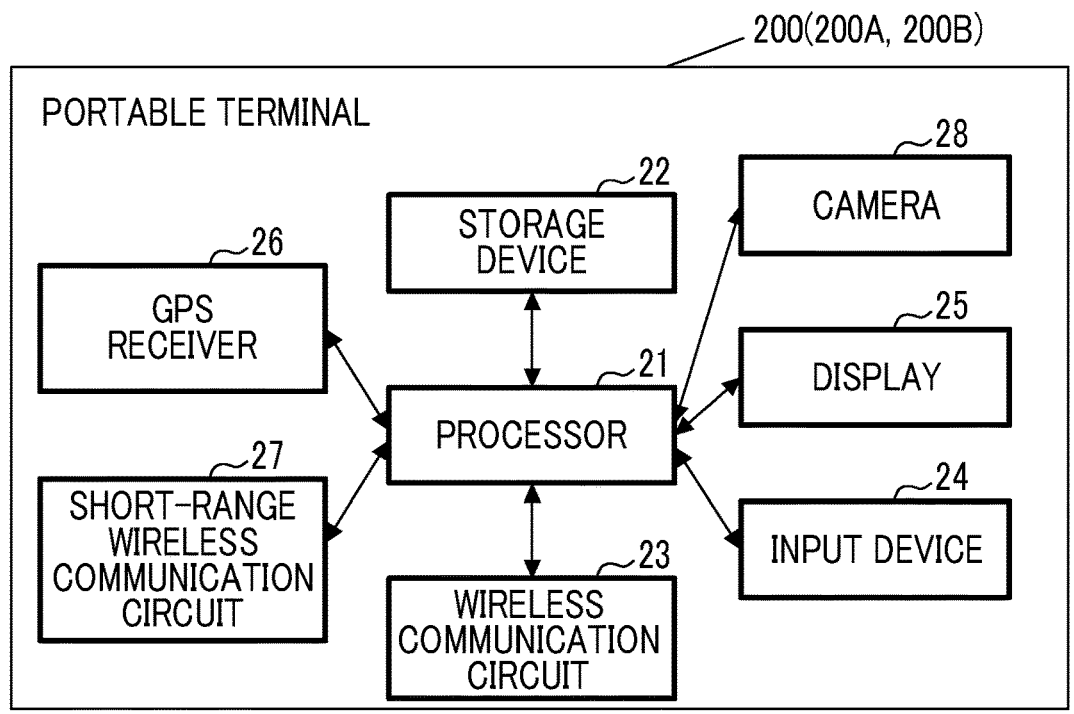
FIG. 2 is a block diagram illustrating a configuration example of a terminal that can be used as a service user terminal and an agent terminal.

FIG. 2 illustrates a configuration example of the portable terminal 200 that can be used as the user terminal 200A or the agent terminal 200B. The portable terminal 200 includes a processor 21, a storage device 22, a wireless communication circuit 23, an input device 24, a display 25, a global positioning system (GPS) receiver 26, a short-range wireless communication circuit 27, and a camera 28.

The storage device 22 includes a main storage device and an auxiliary storage device. The main storage device is used as a program and data storage region, a program development region, a program work region, a communication data buffer region, and the like. The main storage device is configured by a random access memory (RAM) or a combination of a RAM and a read only memory (ROM). The auxiliary storage device is used as a data and program storage region. The auxiliary storage device includes a nonvolatile storage medium such as a hard disk, a solid state drive (SSD), a flash memory, and an electrically erasable programmable read-only memory (EEPROM).

The wireless communication circuit 23 administers wireless communication complying with a wireless communication method supported by the portable terminal 200 (such as the LTE and a wireless LAN (WiFi)). The input device 24 includes a key, a button, a pointing device, a touch panel, and so on, and is used for information input. The display 25 is, for example, a liquid crystal display and displays information and data. The GPS receiver 26 receives a signal from a GPS satellite and calculates the position of the portable terminal 200. The short-range wireless communication circuit 27 administers short-range wireless communication complying with a predetermined short-range wireless communication standard (such as the Near Field Communication (NFC), the Bluetooth (registered trademark) Low Energy (BLE), the Ultra-wideband (UWB), and the Zigbee). The camera 28 is formed by, for example, an optical system and an imaging element such as a charge coupled device (CCD) and a complementary metal oxide semiconductor (CMOS), and is used for capturing a desired image (such as a still image and a moving image).

The processor 21 is, for example, a central processing unit (CPU). The processor 21 operates the portable terminal 200 as the user terminal 200A and the agent terminal 200B by executing various programs stored in the storage device 22.

Configuration of Management Device

Figure 3:
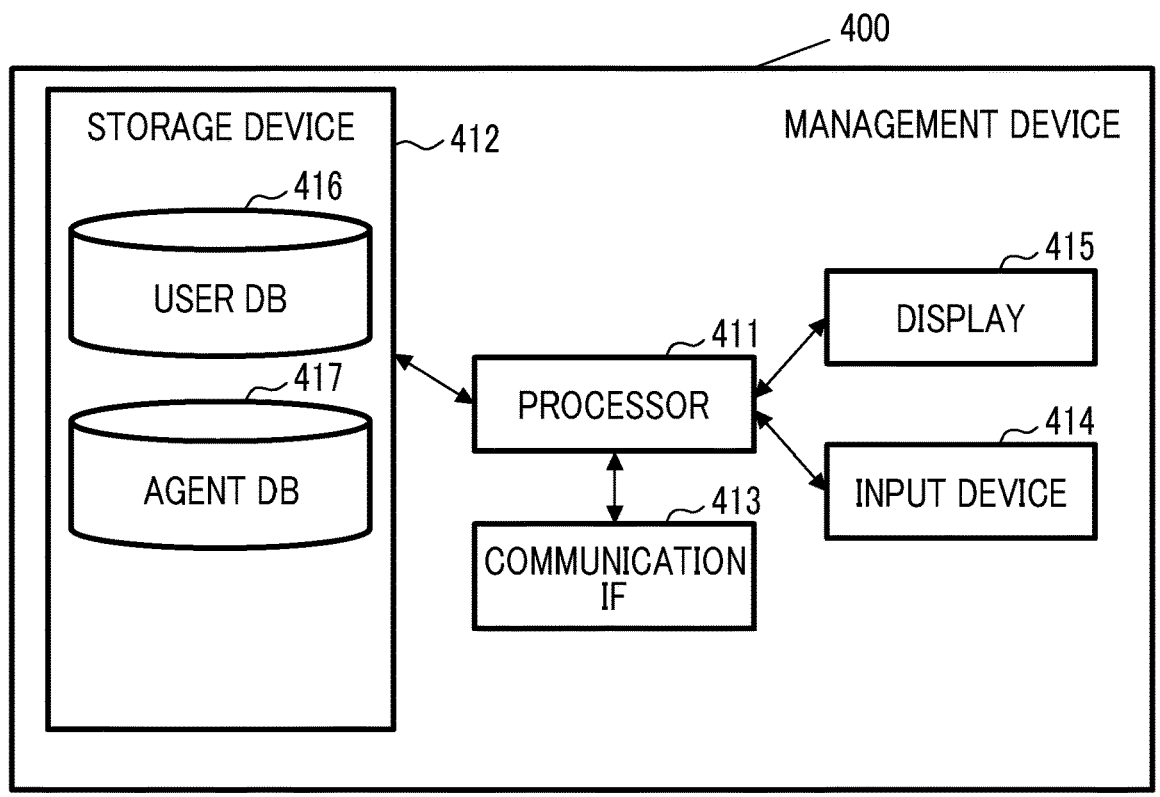
FIG. 3 is a block diagram illustrating a configuration example of a management device.

FIG. 3 is a block diagram that illustrates a configuration example of the management device 400. A universal information processing device such as a personal computer and a workstation or a dedicated information processing device such as a server machine is applied as the management device 400. The management device 400 includes a processor 411, a storage device 412, a communication interface (hereinafter, referred to as a communication IF) 413, an input device 414, and a display 415.

Applicable as the processor 411, the storage device 412, the input device 414, and the display 415 are those similar to the examples described with regard to the processor 21, the storage device 22, the input device 24, and the display 25, respectively. However, depending on differences in terms of the purpose of use and applications, those that are different in performance from those applied to the portable terminal 200 are applied.

The communication IF 413 administers communication processing. A network interface card (NIC) or the like can be applied as the communication IF 413. The communication IF 413 transmits and receives data and information to and from the user terminal 200A and the agent terminal 200B via the network 1. By executing various programs stored in the storage device 412, the processor 411 operates the management device 400 as the parking assistance service management device and the authentication information issuing device.

At least a part of the processing that is performed by the processor 21 and the processor 411 may be executed by a non-CPU processor such as a digital signal processor (DSP) and a graphics processing unit (GPU), a dedicated or universal integrated circuit such as an application specific integrated circuit (ASIC) and a field programmable gate array (FPGA), or a combination of a processor and an integrated circuit. The combination is referred to as a microcontroller unit (MCU), a system-on-a-chip (SoC), a system large-scale integration (LSI), a chipset, or the like.

Description of DB

The storage device 412 stores, for example, a user database (hereinafter, referred to as a user DB) 416 and an agent database (hereinafter, referred to as an agent DB) 417. The storage device 412 may also store, for example, a parking lot database (hereinafter, referred to as a parking lot DB (not illustrated)) storing parking lot information.

The user DB 416 stores user information. FIG. 4 is a table that illustrates a data structure example of the user DB 416. In the user DB 416, personal information on a user, vehicle information, key unit information, and service use-related information are stored in association with a user ID, which is service user identification information. The user ID may be information unique to the user. The personal information on the user includes the service user's name, contact information (such as his or her address, phone number, and mail address), and user terminal information and the like. The user terminal information is information for communication between the management device 400 and the user terminal 200A. The user terminal information includes, for example, the Internet protocol (IP) address and the media access control (MAC) address of the user terminal 200A. Personal information on the user other than those exemplified above may be further included as well. The personal information on the user is stored during, for example, user registration. The personal information on the user may be stored at a timing other than a user registration timing as well.

The vehicle information is information for visually specifying the vehicle 10. Examples of the vehicle information include the type of the vehicle, its vehicle number (vehicle registration number), and its color (such as its painted color: body color). In addition to the above, the vehicle information may include features useful for an agent to discover the vehicle 10. The characteristic information can include information contributing to identification of the vehicle 10 such as the presence of optional parts (such as a roof carrier, a roof box, and a spare tire), the presence of a special paint (different painting or image drawing), and pasting of a sticker. The vehicle information is stored in the user DB 416 when, for example, the use of the service is applied for. Alternatively, the vehicle information may be stored during user registration. Alternatively, the vehicle information registration is optional.

The key unit information is information related to the key unit 100 placed in the vehicle 10 and is used for issuing authentication information suitable for the key unit 100. Although the service user registers the personal information on the user and the vehicle information described above in the present embodiment, it is also possible for a vehicle seller or a factory where the vehicle 10 is assembled to register a part or the whole of the personal information on the user and the vehicle information described above on behalf of the user before vehicle delivery.

The service use-related information is information related to the use of the service and includes, for example, the date and time of use and a delivery place for the vehicle 10. The date and time of use indicate, for example, an estimated delivery time for the vehicle 10. The date and time of use can include an estimated retrieval time for the vehicle 10 as well. Information indicating a service user's destination is stored as the service use-related information. Information indicating a parking lot selection condition desired by the service user and information indicating a path selection condition also may be stored as the service use-related information. In the user DB 416, an agent ID associated with the user ID of the service user can be registered as information indicating the association (correspondence relationship) between the service user and the agent. The service use-related information may also include information other than the above. For example, information indicating the position of the vehicle 10 and received from the user terminal 200A may also be stored as the service use-related information.

FIG. 5 is a table that illustrates a data structure example of the agent DB 417. In the agent DB 417, personal information on the agent, status information, and so on are stored in association with the agent ID, which is agent identification information. The agent ID may be information unique to the agent. The personal information on the agent includes the agent's name and contact information (such as his or her address, phone number, and mail address) and agent terminal information. The agent contact information is used for individual contact with the agent. The agent terminal information includes information for identifying the agent terminal 200B such as the IP address and the MAC address of the agent terminal 200B. The agent terminal information is used for communication between the management device 400 and the agent terminal 200B.

The status information includes, for example, at least one of the respondability of the agent, a location area, position information, and a movement speed. Further information items may be included as well. The respondability of the agent is information indicating whether or not each agent can undertake parking assistance. In a case where the agent is already dispatched or off duty, the respondability is set to "non-respondable (NG)". In a case where the agent is not dispatched and on duty, the respondability is set to "respondable (OK)". The location area indicates the geographical area to which the current position of the agent (agent terminal 200B) belongs. The geographical area may be an administrative district or may be an area partitioned in accordance with an appropriate rule by the administrator. The geographical area may also be within a circle that has a predetermined radius about the position of the agent terminal 200B. The position information indicates the position information of the agent terminal 200B. The movement speed indicates the average movement speed of the agent obtained from the position information. The number of samples used for the average movement speed calculation can be appropriately selected. The location area, the position information, and the movement speed are used for agent screening. Status information-based agent selection is optional. As exemplified in FIG. 5, the user ID associated with the agent ID may be registered in the agent DB 417. In a case where a corresponding user ID is searched for by means of the agent ID used as a search key, the corresponding user ID is registered in the agent DB 417.

In a case where the parking lot DB (not illustrated) is stored, the parking lot DB stores, for example, the name of a parking lot, its location (parking lot position information), contact information regarding a manager of the parking lot, information indicating specifications of the above-described parking lot (specification information), and parking fee information in association with a parking lot ID as a unique ID provided for the parking lot. Corresponding user ID and agent ID also can be registered in the parking lot DB. Not all of the above-described information items are essential, and information other than the above information may be stored as well.

Example of Operation During User Registration

Figure 6:
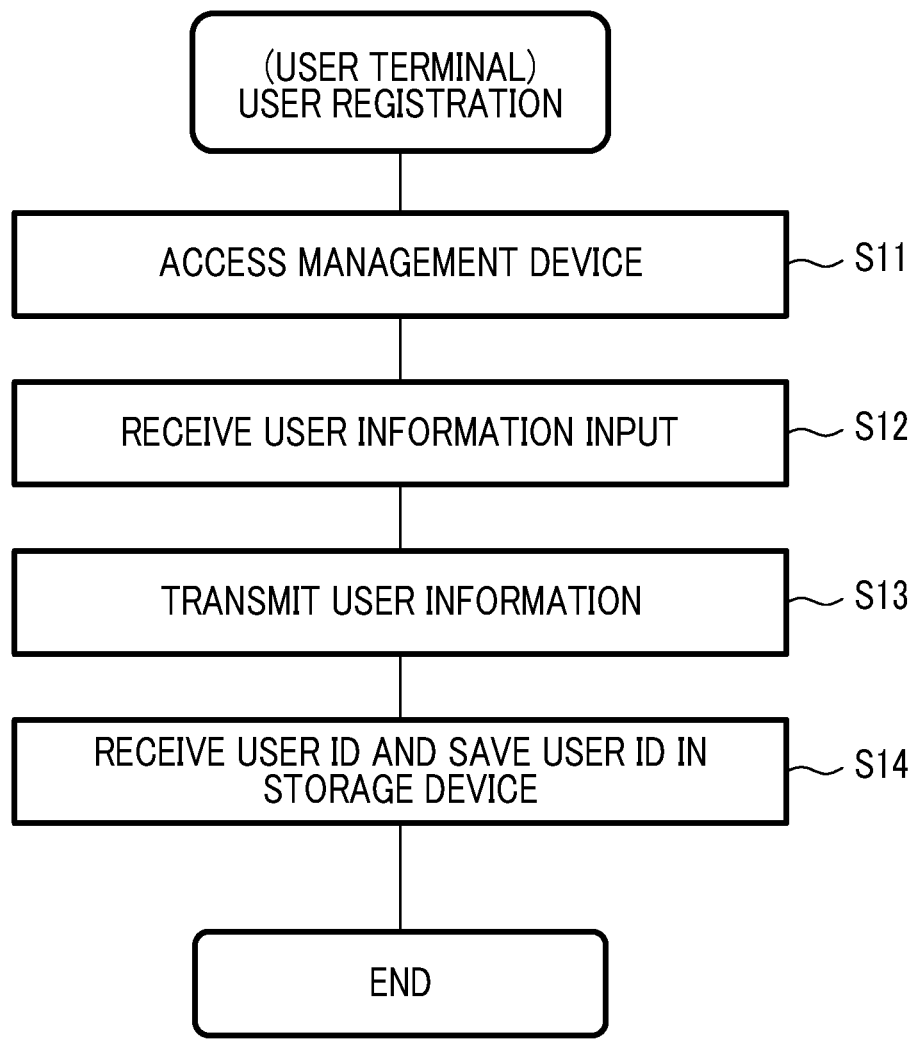
FIG. 6 is a flowchart illustrating the flow of processing on the user terminal during user registration.
Figure 7:
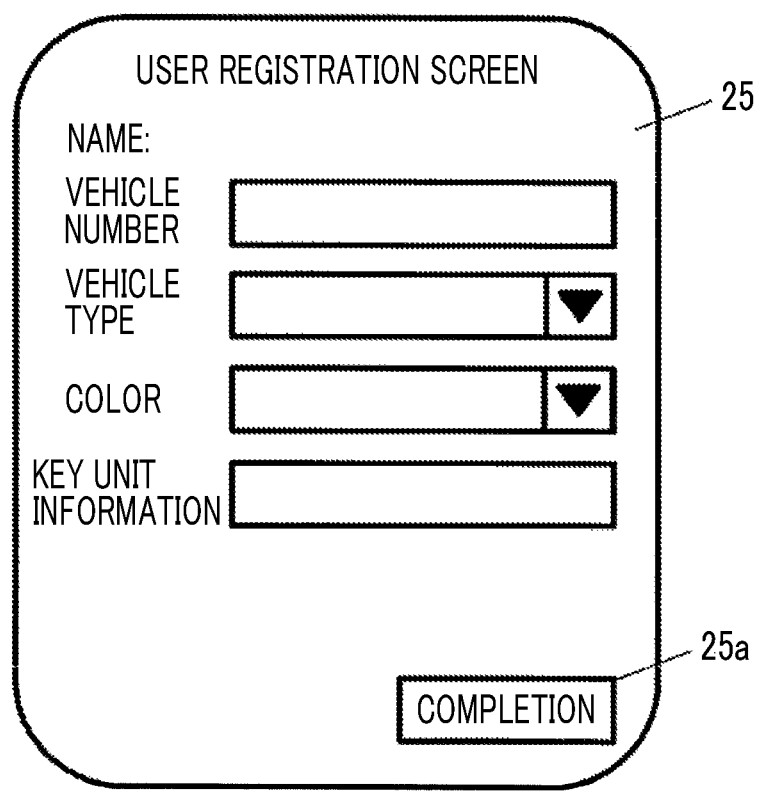
FIG. 7 is a diagram illustrating a user registration screen example.
Figure 8:
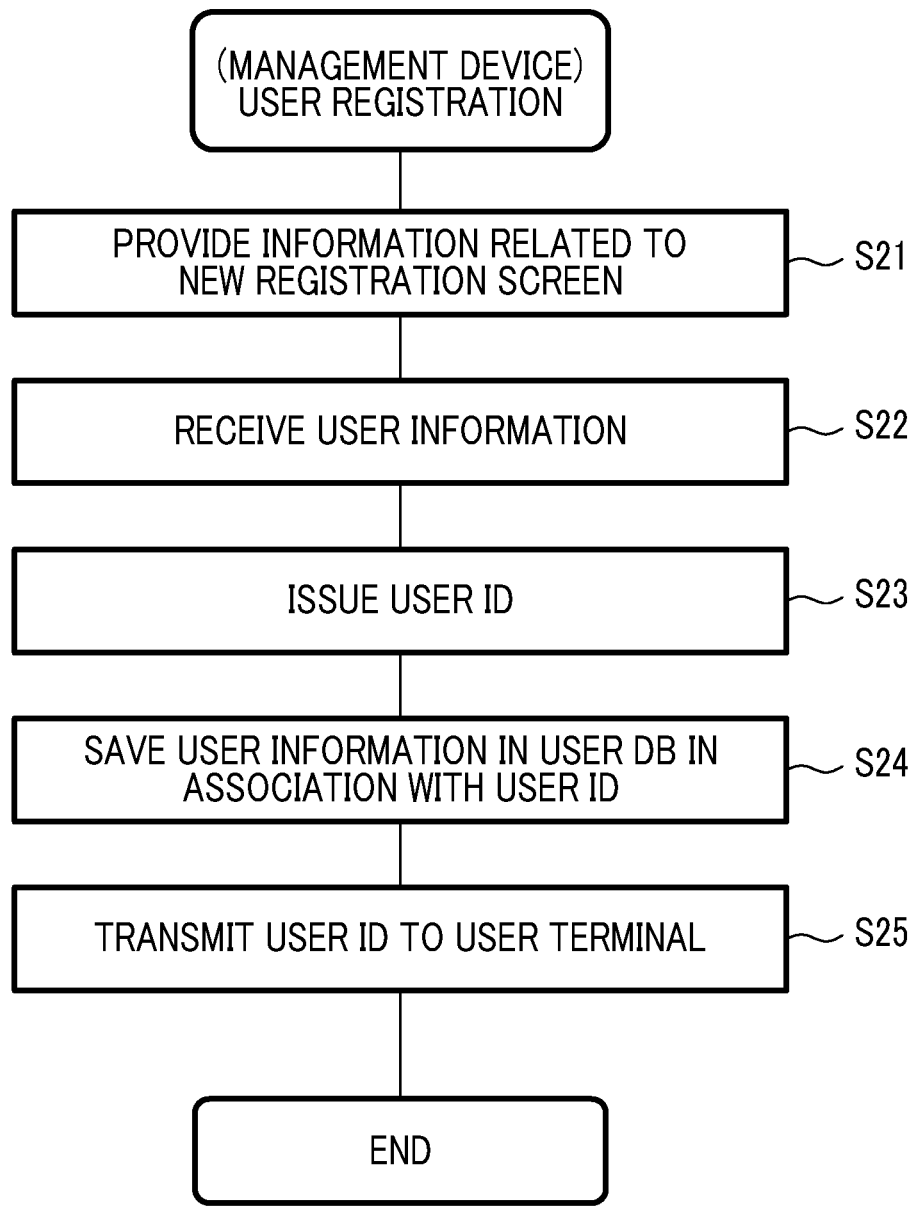
FIG. 8 is a flowchart illustrating the flow of processing on the management device during user registration.

Operation examples regarding the user terminal 200A and the management device 400 during service user registration of the service user (new registration: <1> in FIG. 1) will be described below. FIG. 6 is a flowchart illustrating the flow of processing of the user terminal 200A during user registration. FIG. 6 illustrates processing performed by the processor 21 (FIG. 2) of the user terminal 200A. FIG. 7 is a diagram that illustrates a user registration screen example. FIG. 8 is a flowchart illustrating the flow of processing of the management device 400 during user registration. FIG. 8 illustrates processing performed by the processor 411 of the management device 400.

As illustrated in FIG. 6, in a case where the user wishes to perform user registration, the user accesses the management device 400 (parking assistance service website (hereinafter, also referred to as an operation site)) by using the user terminal 200A (S11 in FIG. 6). In S11, the user terminal 200A establishes a communication session with the management device 400 via the network 1, and enters a state where information and data can be transmitted and received by means of the communication session. The management device 400 provides information related to a new registration screen with respect to the access from the user terminal 200A (S21 in FIG. 8). The user terminal 200A is capable of displaying, on the display 25, a screen (webpage) based on the screen information that is transmitted from the operation site by executing a browser in a program. A dedicated application installed in the user terminal 200A may be used for the screen display of the information from the operation site.

As illustrated in FIG. 7, the user registration screen that is displayed on the display 25 has an input field for personal information on the user such as the user's name, vehicle information such as a vehicle number, a vehicle type, and a color, and key unit information as user information. The processor 21 receives input of each information piece (S12 in FIG. 6). The information items that can be input by means of the user registration screen are not limited to the above and can be appropriately selected. Once the necessary items are entered into the input field and a completion button 25a is pressed, the processor 21 transmits the input user information to the management device 400 (S13 in FIG. 6). Upon receiving the user information (S22 in FIG. 8), the processor 411 of the management device 400 issues the user ID (S23 in FIG. 8) and saves the user information in the user DB 416 in association with the user ID (S24 in FIG. 8). As an example of the user terminal information, the transmission source IP address of a packet used for the user information transmission is registered in the user DB 416. The management device 400 transmits the user ID to the user terminal 200A (S25 in FIG. 8). The processor 21 of the user terminal 200A receives the user ID and stores it in the storage device 22 (S14 in FIG. 6). In this manner, the user registration is completed. The user ID stored in the user terminal 200A is given to the information transmitted to the management device 400 and is used for information storage in the record of the corresponding user DB 416.

Example of Operation During Service Use Application

Figure 9:
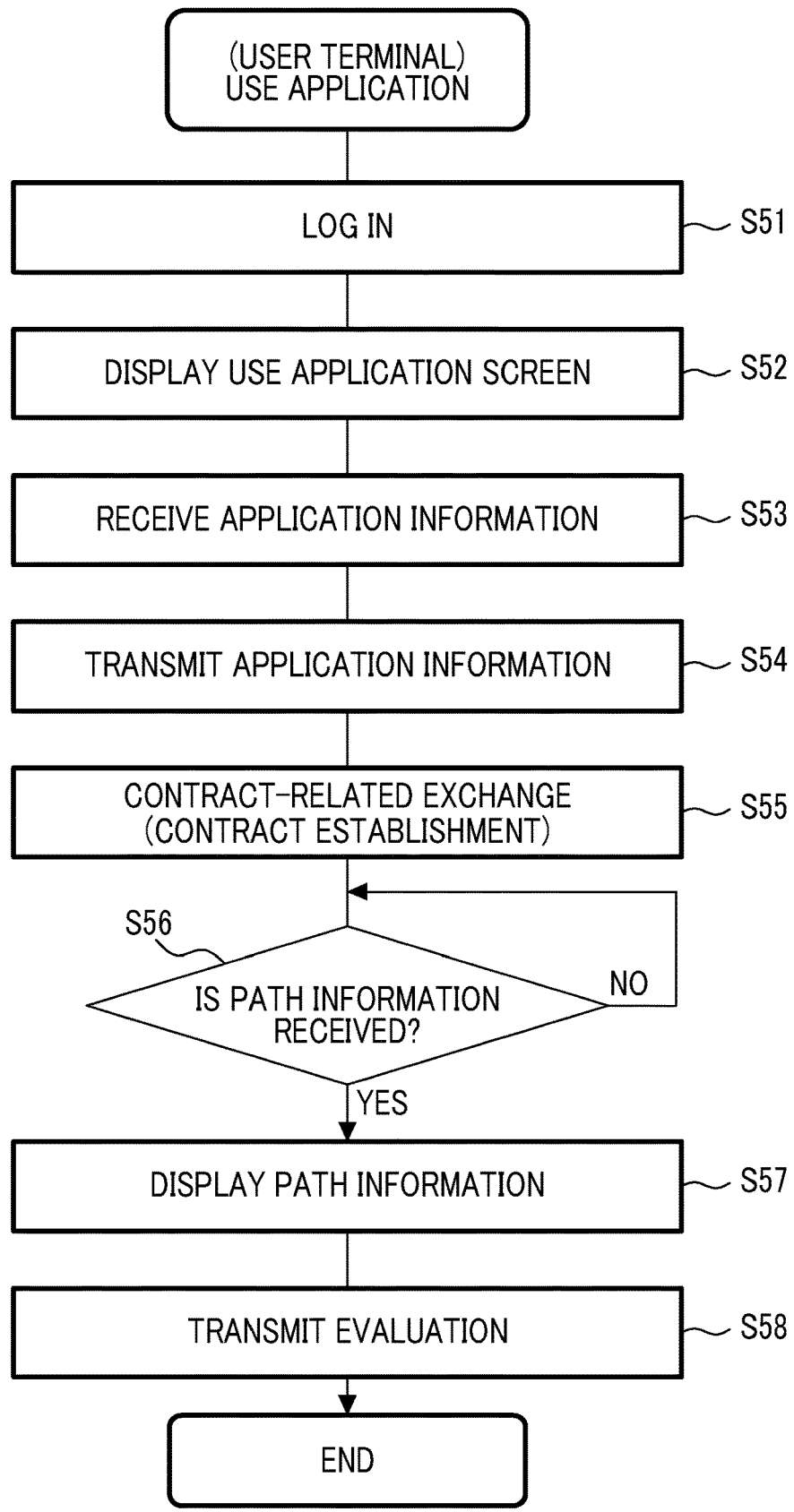
FIG. 9 is a flowchart illustrating an example of processing on the user terminal during use application.
Figure 10:
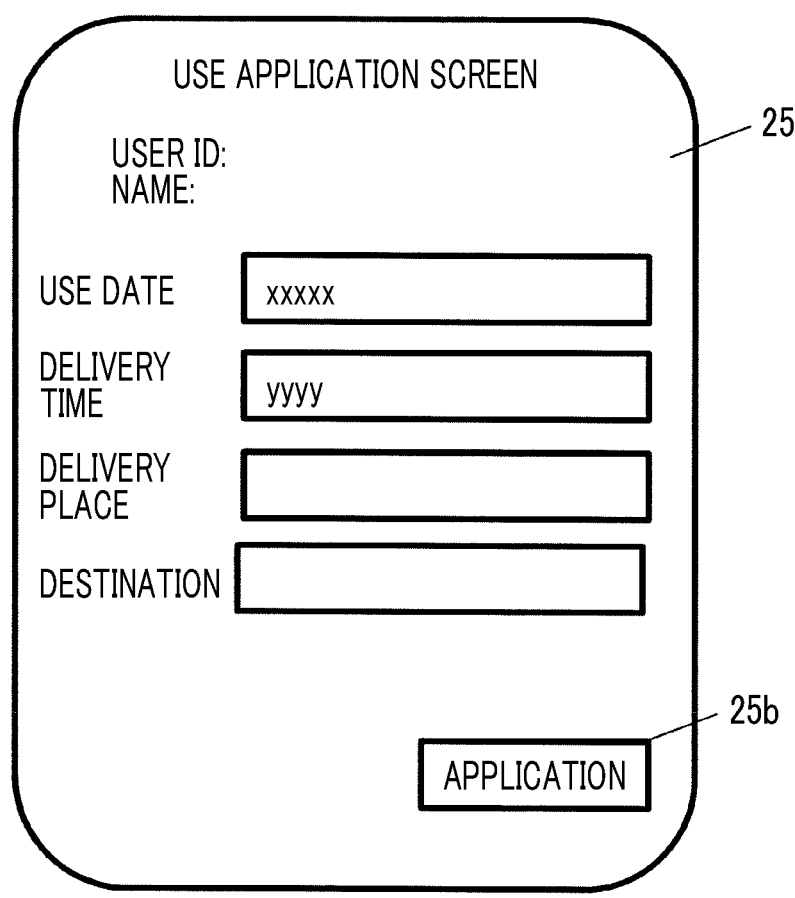
FIG. 10 is a diagram illustrating a use application screen example.
Figure 11:
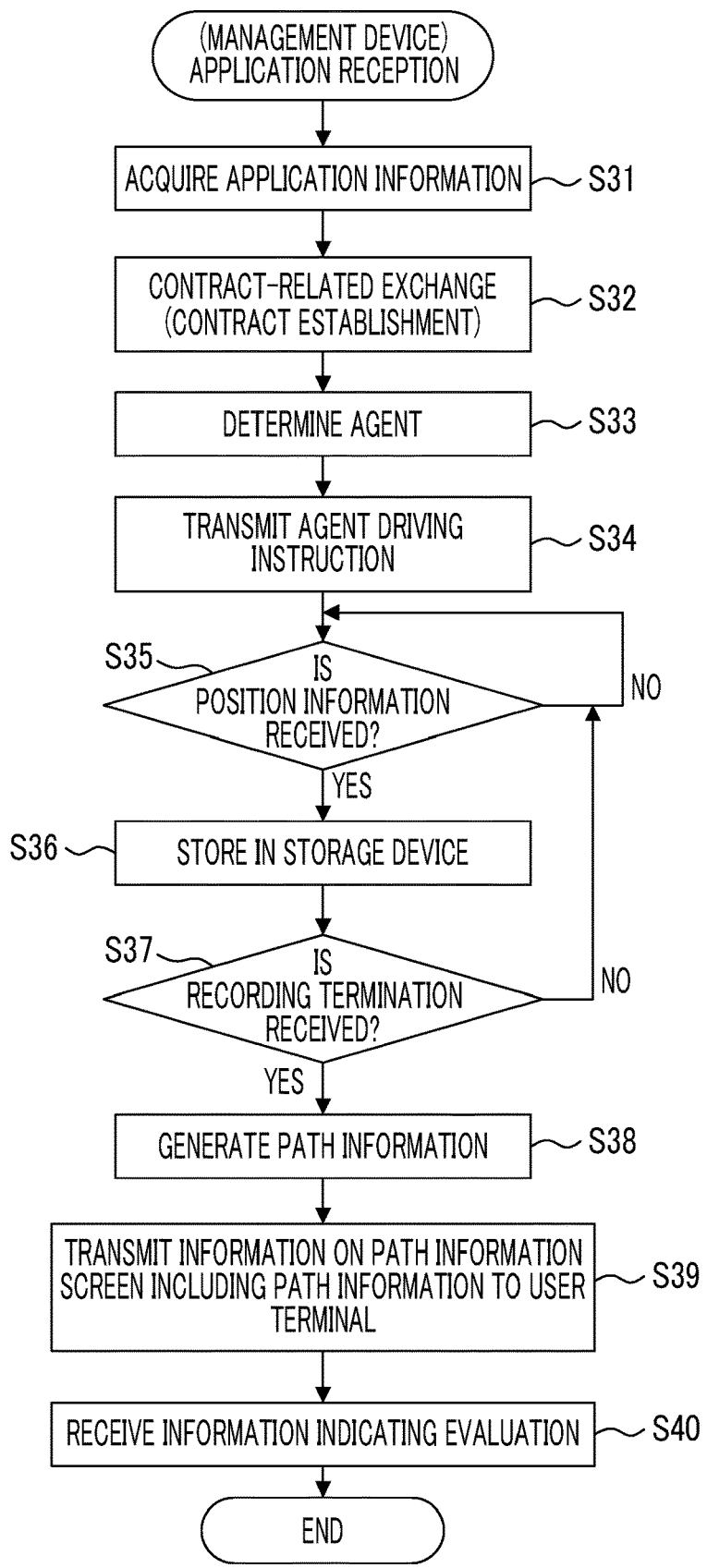
FIG. 11 is a flowchart illustrating an example of processing on the management device during use application.

Operation examples regarding the user terminal 200A and the management device 400 during service use application (<2> in FIG. 1) will be described below. FIG. 9 is a flowchart illustrating a processing example regarding the user terminal 200A during the use application, and FIG. 10 is a diagram illustrating a use application screen display example. FIG. 11 is a flowchart illustrating a processing example regarding the management device 400 during the use application. The processing that is illustrated in FIG. 9 is performed by the processor 21 of the user terminal 200A executing a program, and the processing that is illustrated in FIG. 11 is performed by the processor 411 of the management device 400 executing a program.

In FIG. 9, the service user operates the user terminal 200A and logs in to the operation site by using the user ID (S51 in FIG. 9) in a case where the service user uses the parking assistance service. In response to a request from the user terminal 200A that has successfully logged in, the management device 400 transmits information on the use application screen to the user terminal 200A. The processor 21 of the user terminal 200A displays, on the display 25, the use application screen based on the information on the use application screen (S52 in FIG. 9).

As illustrated in FIG. 10, the use application screen has an input field for input of, for example, the user ID, a name, a date of use, a delivery time for the vehicle 10, a delivery place, and a destination of the service user. Destination input is optional. Once the service user puts in the necessary items and presses an application button 25b, the processor 21 receives the application information (including, for example, the user ID, name, date of use, delivery time, delivery place, and destination) (S53 in FIG. 9), and transmits the application information to the management device 400 (S54 in FIG. 9).

Upon receiving (acquiring) the application information (S31 in FIG. 11), the management device 400 performs exchange related to parking assistance service contract conclusion with the user terminal 200A (S32 in FIG. 11 and S55 in FIG. 9). For example, the management device 400 transmits, to the user terminal 200A, information including contract-related items such as the service fee and the presence or absence of parking fee burden, and the processor 21 of the user terminal 200A displays the information on the display 25. The service user refers to the contract-related items. Once the service user enters his or her approval (indicating his or her willingness to conclude the parking assistance service contract), information on the approval is transmitted to the management device 400. The contract is established when the management device 400 receives the information on the approval. The management device 400 sends information on the contract establishment, and the user terminal 200A receives the information on the contract establishment. Then, the user terminal 200A is put into a state of waiting for path information on the vehicle 10 from the management device 400 (S56 in FIG. 9). Alternatively, the user terminal 200A may transmit a path information provision request to the management device 400 in response to the occurrence of a predetermined trigger or event and wait for the path information once the transmission occurs.

Once the contract is established, the processor 411 of the management device 400 performs agent determination processing (S33 in FIG. 11). In other words, the processor 411 of the management device 400 automatically selects an agent in, for example, the following manner. In other words, the processor 411 refers to the agent DB 417, extracts respondable agents, and randomly selects an agent from those located in the delivery place. Alternatively, an agent close to the delivery place in terms of his or her position indicated by the position information may be selected. Alternatively, an agent with a high movement speed may be selected among those located in the delivery place. As a premise of the processing, the management device 400 receives position information on a regular basis from the agent terminal 200B and records the position information in the agent DB 417. This selection method is an example, and the agent can be appropriately selected in accordance with a predetermined selection rule in which parameters included in the status information are individually used or used in combination. The processor 411 associates the agent ID of the selected agent with the user ID of the service user. The processor 411 registers the correspondence relationship between the agent ID and the user ID in at least one of the user DB 416 and the agent DB 417. In the present embodiment, an example is described in which the correspondence relationship between the user ID and the agent ID is registered in the agent DB 417. The processor 411 transmits the agent driving instruction for the vehicle 10 to the agent terminal 200B by using the agent terminal information corresponding to the agent ID (S34 in FIG. 11 and <3> in FIG. 1). The agent driving instruction includes user information corresponding to the user ID associated with the agent ID (user name, contact information, vehicle information, key unit information, date and time of use, and delivery place). Further, parking lot information indicating a parking lot also may be included in the case of pre-parking lot determination.

Provision of Path Information

An operation example related to provision of the path information on the vehicle 10 will be described below. Once the agent driving instruction is received by the agent terminal 200B, the agent can go to the delivery place or receive authentication information issuance by using the user information in the agent driving instruction received by the agent terminal 200B.

The agent may move on foot or may use a moving vehicle (including a two-wheeled vehicle and a bicycle) and another means for moving. The vehicle of the agent may be driven by the agent or a companion. For example, it is desirable that the agent visits the delivery place with a companion by means of a moving vehicle and the companion picks up the agent with the moving vehicle after parking assistance for the vehicle 10. The agent may receive, for example, the position of the vehicle 10 that the management device 400 receives from the user terminal 200A with the agent terminal 200B and go to the delivery place by using the position of the vehicle 10 as a clue.

In a case where the agent finds the vehicle 10 in the delivery place, the agent operates the agent terminal 200B and transmits an authentication information issuing request to the management device 400. The agent terminal 200B is capable of obtaining the address of the management device 400 by learning of the transmission source address of the agent driving instruction. Alternatively, the management device 400 may designate the transmission destination address of the authentication information issuing request.

Upon receiving the issuing request, the management device 400 acquires authentication information (pre-stored in, for example, the storage device 412) corresponding to key unit information by referring to the key unit information of the service user in the user DB 416 and transmits the authentication information to the agent terminal 200B (<4> in FIG. 1). The wireless communication circuit 23 of the agent terminal 200B receives the authentication information from the management device 400 via the network 1. The processor 21 of the agent terminal 200B transmits the authentication information received from the management device 400 to the key unit 100 (in-vehicle unit). As a result, the key unit 100 operates as an electronic key. As a result, a door lock of the vehicle 10 is released and the engine is started by the engine start button in the vehicle 10 being pressed. In other words, the vehicle 10 is ready for operation. The agent can drive the vehicle 10 to the parking lot on behalf of the user.

In the above-described embodiment, the issuing request is transmitted after the agent terminal 200B arrives at the delivery place. Alternatively, it is also possible for the agent terminal 200B to receive the authentication information by transmitting the issuing request at an appropriate timing after agent driving instruction reception. In the present embodiment, the management device 400 transmits the authentication information to the agent terminal 200B after waiting for issuing request reception. Also conceivable is sending the authentication information with the agent driving instruction with issuing request reception omitted.

Figure 12:
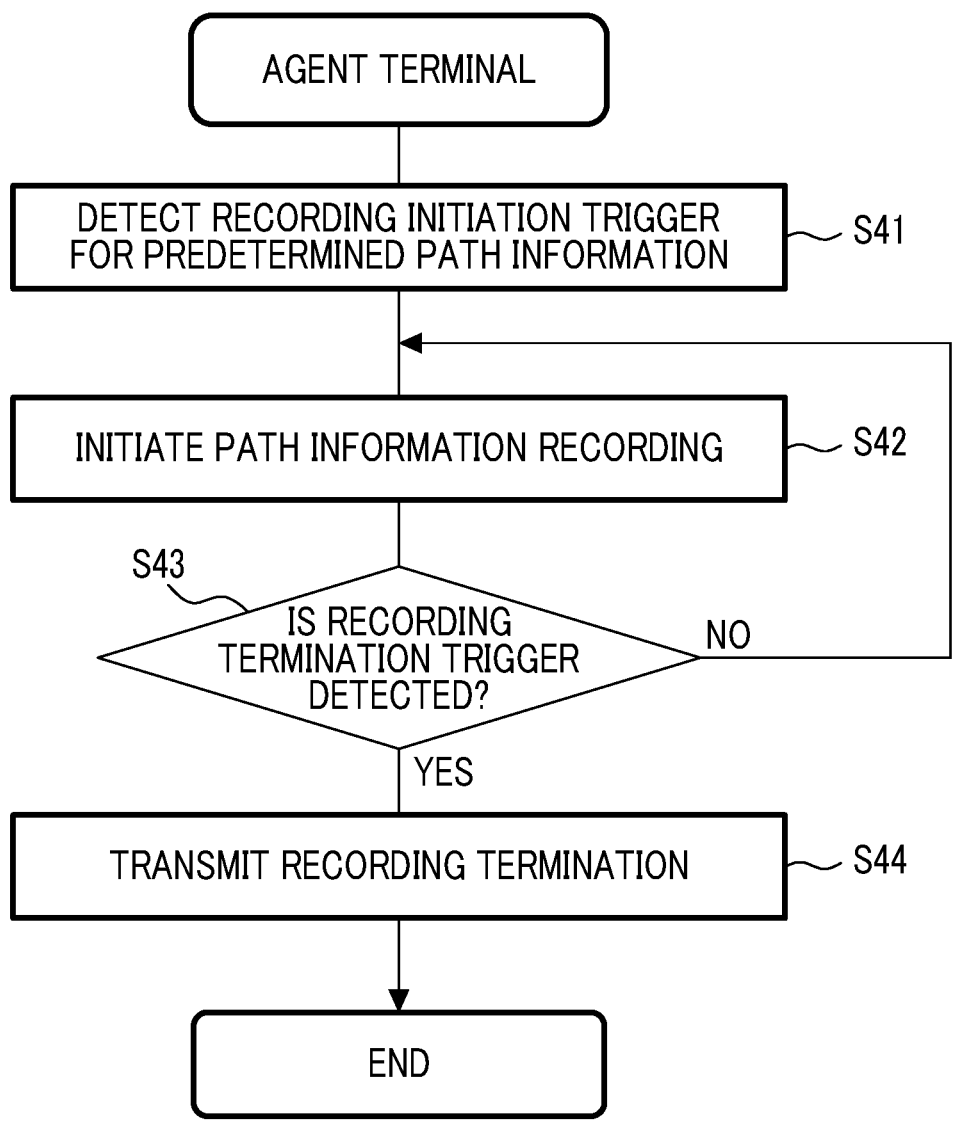
FIG. 12 is a flowchart illustrating an example of processing on the agent terminal.

In FIG. 12, the processor 21 of the agent terminal 200B detects a trigger of recording initiation of predetermined path information (S41 in FIG. 12) and initiates path information recording (S42 in FIG. 12). The agent terminal 200B initiates recording by receiving the path information recording initiation trigger, and terminates the recording upon receiving a recording termination trigger. The recording initiation trigger may be input to the agent terminal 200B and the processor 21 may detect the trigger by, for example, the agent pressing a trigger input interface prepared in the agent terminal 200B (such as a physical button and a button displayed on the display 25). Alternatively, a sensor (not illustrated) may detect a predetermined operation (such as door lock or door lock release, engine start or stop, and door opening or closing) on the vehicle 10 in a state of being operable by the agent by means of the authentication information and the agent terminal 200B may receive a signal indicating the predetermined operation as a trigger signal. The path information recording initiation and termination based on the initiation and termination triggers are the same even in a case where the initiation and termination are performed by an in-vehicle terminal or a drive recorder of the vehicle 10 instead of the agent terminal 200B.

In the present embodiment, the agent operates the agent terminal 200B, calls a recording start button on the display 25, and presses the record start button when the agent starts to move the vehicle 10 from the delivery place to the parking lot. As a result, a recording initiation trigger is input to the agent terminal 200B, and the processor 21 detects the recording initiation trigger. Also detectable as the recording initiation trigger are door lock release, engine start, opening or closing of the driver's door, a combination of two or more of the above, and so on.

The processor 21 of the agent terminal 200B periodically acquires information indicating the position coordinates of the agent terminal 200B by using a signal that the GPS receiver 26 receives from a GPS satellite upon trigger detection, and records the information as position information on the vehicle 10. The position information indicating the position of the vehicle 10 may be obtained from, for example, the correspondence relationship between a geographical area and the cell ID (cell identification information) of a radio base station wirelessly communicating with the agent terminal 200B or the correspondence relationship between a geographical area and the reception intensity of radio waves received from a radio base station as well as the above-described method for acquisition based on a satellite positioning system such as a GPS. The agent terminal 200B may receive information indicating a position obtained by a car navigation device provided in the vehicle 10 for transmission to the management device 400. Position information obtained from a beacon signal from a roadside unit installed on a road or the like may be transmitted to the management device 400.

The processor 21 of the agent terminal 200B may capture an image showing the state of the outside of the vehicle 10 on the move by using the camera 28 and transmit the image to the management device 400 instead of or in addition to the above-described position information. For example, the agent may fixedly dispose the agent terminal 200B from the inside of the vehicle 10 toward its windshield by using a holder or the like and press the imaging start button of the camera 28 as a recording initiation trigger so that the camera 28 captures the scenery from the vehicle 10 on the move. As described above, the position information also includes an image of the outside of the vehicle captured from the vehicle 10 during a movement based on driving for parking assistance. The image may also be an image captured by a drive recorder provided in the vehicle 10.

The processor 21 repeats the processing of S42 until a recording termination trigger is detected (S43 in FIG. 12). Upon detecting the recording termination trigger, the processor 21 transmits the recording termination to the management device 400 (S44 in FIG. 12), and terminates the processing in FIG. 12. For example, the processor 21 detects the recording termination trigger and terminates the recording (position information acquisition by means of the GPS receiver 26 and imaging by means of the camera 28) when the agent who has stopped the vehicle 10 at a parking position in a parking lot presses the recording termination button displayed on the display 25. Also detectable as the recording termination trigger are door lock, engine stop, opening or closing of the driver's door, a combination of two or more of the above, and so on. The agent who has stopped the vehicle 10 in the parking lot comes out of the vehicle 10 and performs predetermined invalidation processing. As a result of the invalidation processing, the key unit 100 stops operating as the electronic key. Then, the operation enablement state of the vehicle 10 is released and the vehicle 10 is locked. As a result, the agent cannot unlock and drive the vehicle 10 again.

In S35 in FIG. 11, the processor 411 of the management device 400 waits for position information reception from the agent terminal 200B. Upon receiving the position information, the processor 411 stores the position information in the storage device 412 (S36 in FIG. 11). The position information reception and storage are repeatedly performed until recording termination reception from the agent terminal 200B (S37 in FIG. 11).

Upon recording termination reception, the processor 411 generates path information by using the position information stored in the storage device 412 (S38 in FIG. 11). For example, the processor 411 is capable of plotting position coordinates as the stored position information on a predetermined map including the delivery place and the parking lot (position where the vehicle 10 is stopped) and generating, as the path information, image information indicating a path connecting the plots with a straight line. Alternatively, the processor 411 is capable of storing a correspondence table of position coordinates stored in the storage device 412 and road information (road ID, road name, intersection name, and so on) and converting the position coordinates into a road ID, a road name, and an intersection name to generate path information indicating the road and the intersection where the vehicle 10 has passed by characters. The path information may include the total traveling distance of the vehicle 10 and its traveling distance by road. In some cases, road information included in a beacon signal or the like may be used as it is as the road information.

The processor 411 edits the image data received from the agent terminal 200B into an image format that can be viewed by the user terminal 200A. Upon path information generation termination, the processor 411 refers to the user DB 416 by searching the agent DB 417 for the user ID associated with the agent's agent ID, and transmits information on a path information screen including the path information to the user terminal 200A by using the user terminal information corresponding to the user ID (S39 in FIG. 11).

Once the information on the path information screen including the path information is received (Yes in S56 in FIG. 9), the processor 21 of the user terminal 200A displays, on the display 25, the path information screen presenting the path information based on the path information screen information (S57 in FIG. 9). As described above, in the processing of S56 in FIG. 9 and S57 in FIG. 9, the processor 21 and the wireless communication circuit 23 operate as acquiring means for acquiring the path information (example of information indicating a path) from the management device 400, and the processor 21 and the display 25 operate as presentation means for presenting the path information to the service user. The processor 21 operates as display control means for performing control for displaying the information indicating the path, on the display 25 (display device). In some cases, the path information may be provided for the service user by means of a voice.

Figure 13:
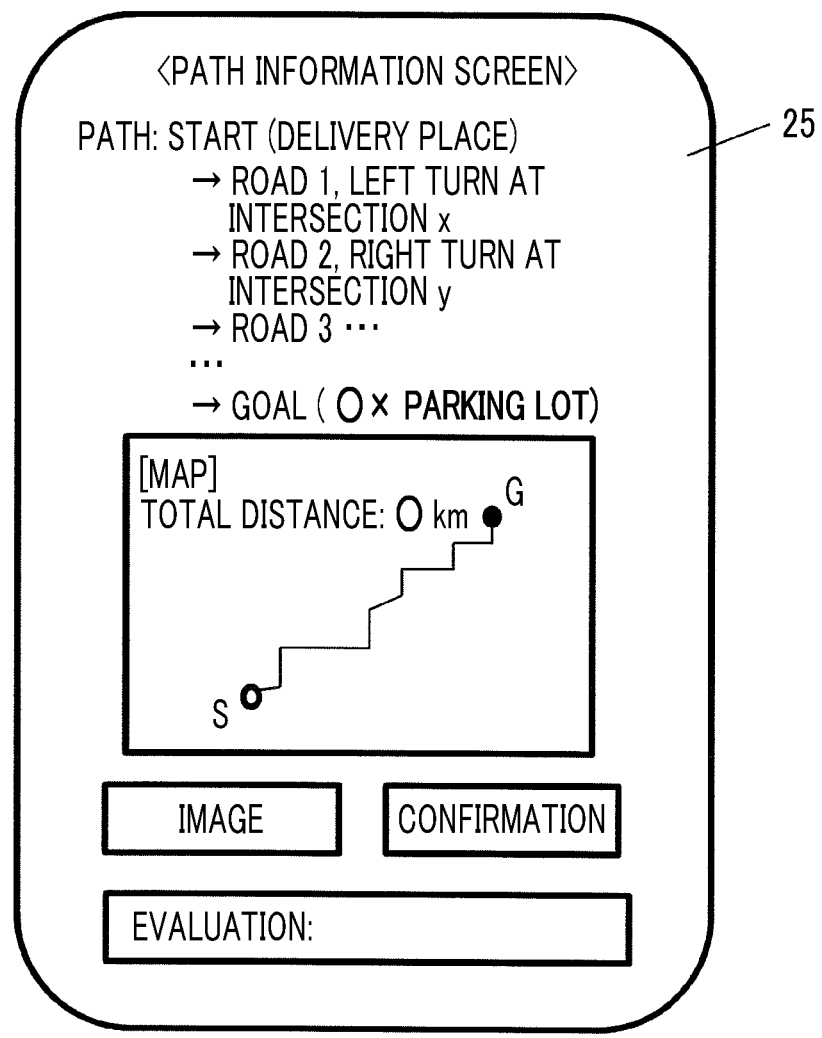
FIG. 13 is a diagram illustrating an example of path information screen display on the user terminal.

FIG. 13 is a diagram illustrating a display example of the path information screen on the user terminal. Displayed on the path information screen is, for example, path information (hereinafter, referred to as path information 1) indicating, in order of traveling, the roads and the intersections through which the vehicle 10 has traveled for a movement between the delivery place as a starting point and the parking lot as a goal point. Displayed on the path information screen is a map (hereinafter, referred to as path information 2) connected by a line indicating the trajectory of the movement (traveling) of the vehicle 10 between the delivery place (S) and the parking lot (G). The total movement distance of the vehicle 10 is indicated on the map. An estimated value of the energy consumption amount of the vehicle 10 may be calculated from the total distance and vehicle information and displayed. In the example that is illustrated in FIG. 13, an image button and a confirmation button are displayed. When the image button is pressed, the image of the outside scenery captured during the movement from the delivery place to the parking lot (hereinafter, referred to as path information 3) is played back. The confirmation button is a button for input of a confirmation of the movement path of the vehicle 10 to the parking lot. At least one of the above-described path information 1, the path information 2, and the path information 3 may be provided as the path information.

The path information screen includes an input field for input of an evaluation of the path used by the agent for the movement of the vehicle 10. The evaluation is answered by selection of one of evaluation values in multiple stages. An opinion on the path can be input as a part of the evaluation. When the confirmation button is pressed, the processor 21 receives the evaluation value and the opinion input in the evaluation input field as information indicating the evaluation, and transmits the information to the management device 400 (S58 in FIG. 9). Upon receiving the information indicating the evaluation (S40 in FIG. 11), the management device 400 stores the information indicating the evaluation in the storage device 412. The information indicating the evaluation (evaluation value and opinion) is used as, for example, data for business improvement (usability improvement) examination.

In the present embodiment, the path information is generated and transmitted to the user terminal 200A after position information recording termination. Alternatively, the path information generation and the transmission to the user terminal 200A may be performed in real time. Also possible is an aspect in which the agent terminal 200B performs path information generation and the management device 400 performs relay processing.

In the above-described operation example related to path information provision, the processor 411 of the management device 400 is an example of a position information acquisition unit that acquires position information from the agent terminal 200B, a generation unit that generates information indicating a path (path information) based on the position information, and an evaluation acquisition unit that acquires a path information evaluation. The processor and the communication IF 413 are examples of a transmission unit that transmits the path information to the user terminal 200A.

Locking and Unlocking System Including Key Unit

Figure 14:
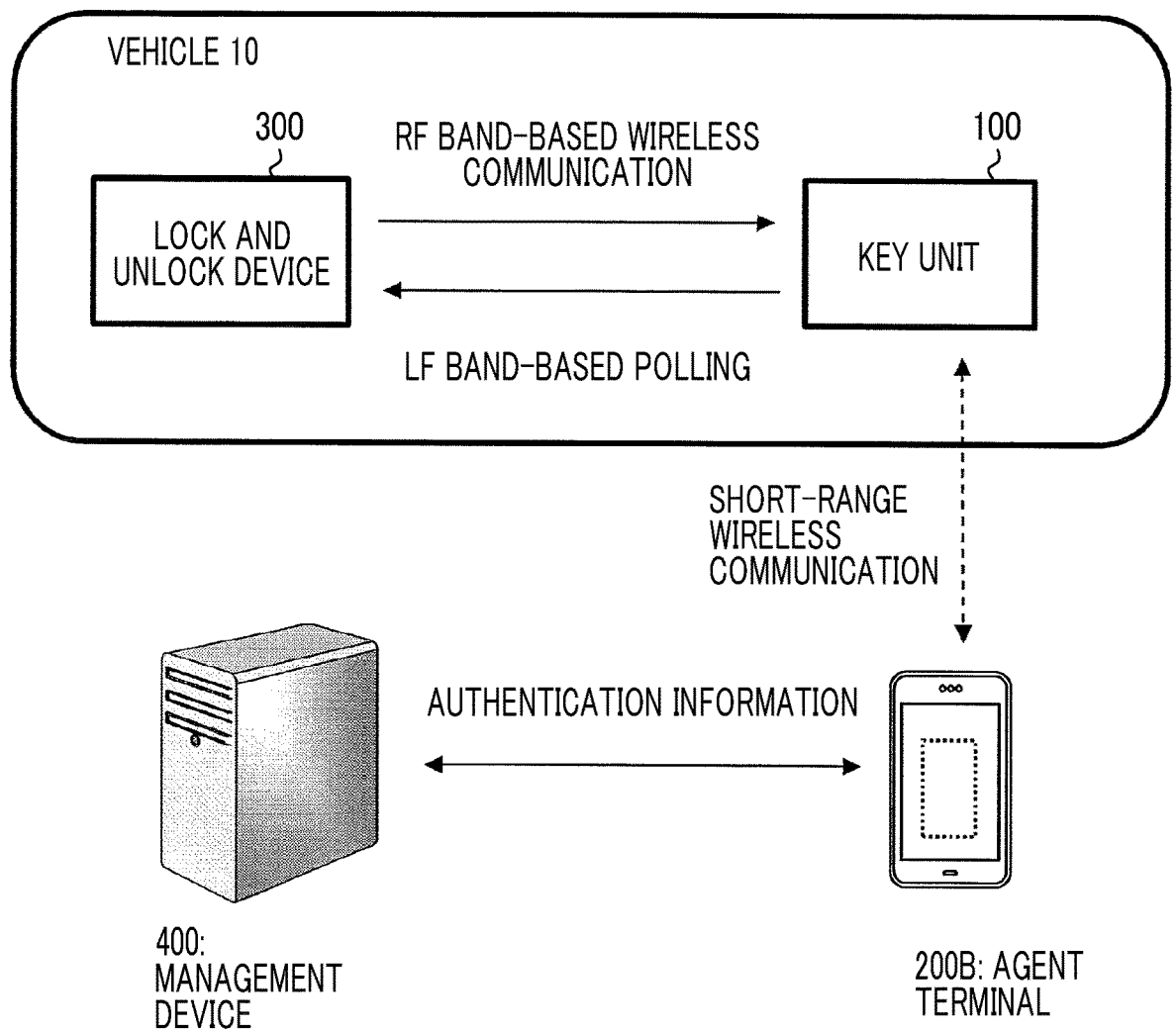
FIG. 14 is a diagram illustrating a schematic configuration of a locking and unlocking system including a key unit.

An example of a locking and unlocking system including the key unit 100 for locking and unlocking of the vehicle 10 will be described below with reference to FIGS. 14 and 15. As illustrated in FIG. 14, the locking and unlocking system is configured to include the key unit 100 and the locking and unlocking device 300 mounted in the vehicle 10, the agent terminal 200B, and the management device 400. In the locking and unlocking system, the key unit 100 has the same wireless interface as the electronic key (portable device) of a smart key, and communicates with the existing locking and unlocking device 300. As a result, the vehicle 10 can be locked and unlocked without a physical key being used. The key unit 100 performs short-range wireless communication with the agent terminal 200B. Whether or not the key unit 100 operates as an electronic key of the vehicle 10 is determined based on the result of authentication of the agent terminal 200B. The agent can lock and unlock the vehicle 10 by operating the agent terminal 200B outside the vehicle 10.

System Configuration

Figure 15:
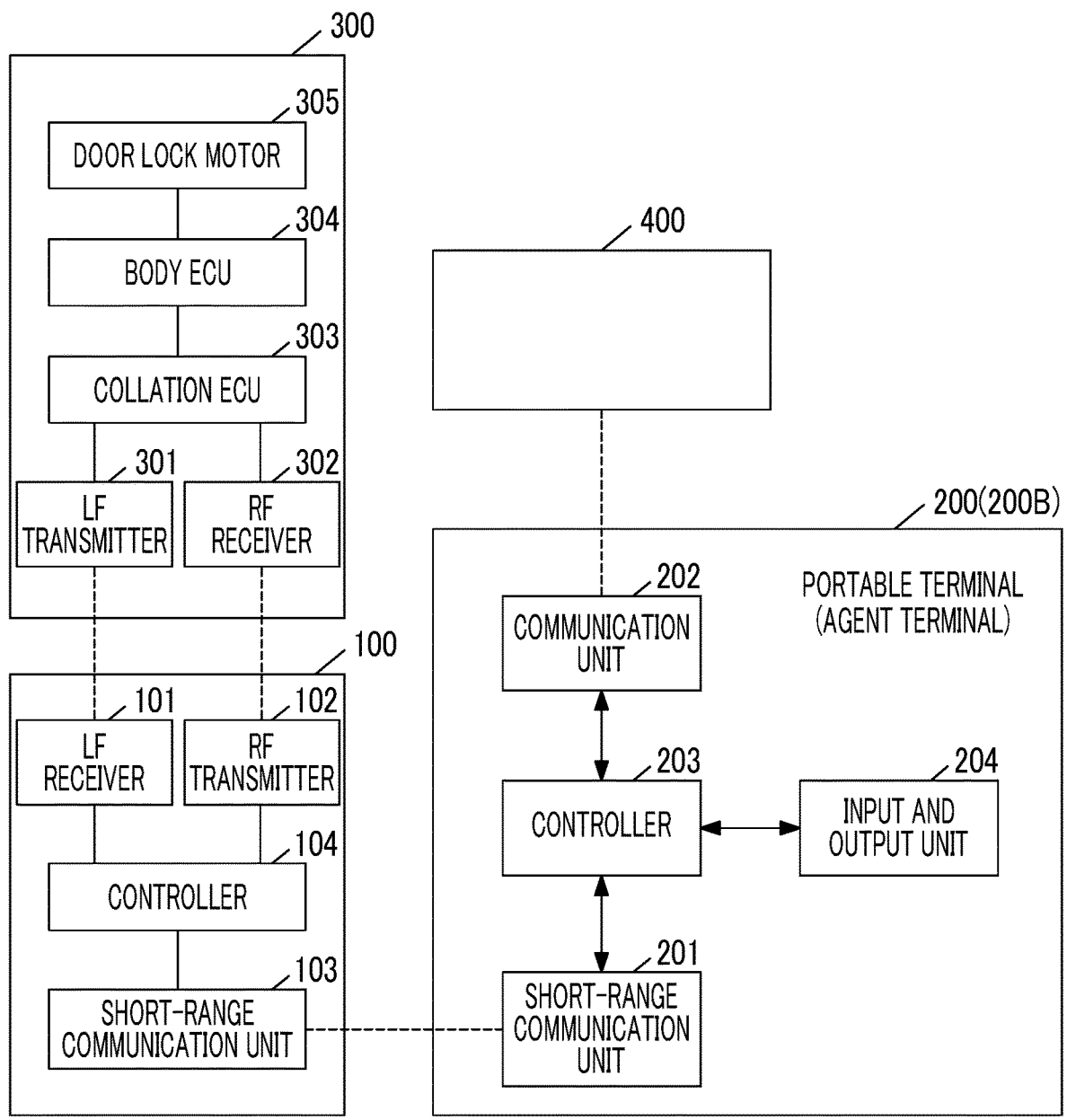
FIG. 15 is a block diagram schematically illustrating an example of the configuration of the key unit, a portable terminal, a locking and unlocking device, and a server device.

In FIG. 15, the locking and unlocking device 300 locks and unlocks the doors of the vehicle 10 in response to a lock signal and an unlock signal transmitted from the electronic key possessed by the user (hereinafter, also referred to as a service user) of the vehicle 10 via radio waves in a radio frequency (hereinafter, referred to as RF) band. In addition, the locking and unlocking device 300 has a function to transmit radio waves in a low frequency (hereinafter, referred to as LF) band for searching for a portable device. The key unit 100 controls locking and unlocking of the doors of the vehicle 10 by transmitting and receiving radio waves in the RF band and the LF band to and from the locking and unlocking device 300 instead of the portable device possessed by the user.

The locking and unlocking device 300 includes an LF transmitter 301, an RF receiver 302, a collation electronic control unit (ECU) 303, a body ECU 304, and a door lock motor 305. The LF transmitter 301 transmits radio waves in a low frequency band (such as 100 KHz to 300 KHz) for searching for (polling) the key unit 100. For example, the LF transmitter 301 is incorporated in the vicinity of the center console and the steering wheel in the cabin of the vehicle. The RF receiver 302 receives radio waves in a radio frequency band (such as 100 MHz to 1 GHz) transmitted from the key unit 100. The RF receiver 302 is disposed anywhere in the vehicle cabin.

The collation ECU 303 performs control for locking and unlocking the doors of the vehicle 10 based on a signal (hereinafter, also referred to as a lock signal or an unlock signal) transmitted from the key unit 100 via radio waves in the RF band. The collation ECU 303 is constituted by, for example, a microcomputer. In the following description, the lock signal and the unlock signal will be collectively referred to as a lock and unlock signal. The term, lock and unlock signal, represents at least one of the lock signal and the unlock signal.

The collation ECU 303 authenticates that the lock and unlock signal from the key unit 100 is a signal transmitted from an authorized device. Specifically, the collation ECU 303 determines whether or not the key ID included in the lock and unlock signal corresponds to the key ID pre-stored in the storage unit of the collation ECU 303. The collation ECU 303 transmits an unlock command or a lock command to the body ECU 304 based on the result of the authentication. The unlock command or the lock command is transmitted via an in-vehicle network such as a controller area network (CAN).

The body ECU 304 is a computer that performs body control for the vehicle 10. The body ECU 304 unlocks and locks the doors of the vehicle 10 by controlling the door lock motor 305 based on the unlock command or the lock command received from the collation ECU 303. The door lock motor 305 is an actuator for locking and unlocking the doors of the vehicle 10 (including its trunk as well as doors for occupants and rear gate). The door lock motor 305 operates based on a signal from the body ECU 304.

The key unit 100 authenticates the agent terminal 200B by performing short-range wireless communication with the agent terminal 200B and transmits the lock and unlock signal by using radio waves in the RF band based on the result of the authentication. The key unit 100 includes, as an example, an LF receiver 101, an RF transmitter 102, a short-range communication unit 103, and a controller 104. The LF receiver 101 receives a polling signal transmitted via radio waves in the LF band from the locking and unlocking device 300. The LF receiver 101 has an antenna (hereinafter, referred to as an LF antenna) for receiving radio waves in the LF band. The RF transmitter 102 transmits the lock and unlock signal to the key unit 100 via radio waves in the RF band.

The short-range communication unit 103 communicates with the agent terminal 200B. The short-range communication unit 103 performs short-range communication by using a predetermined wireless communication standard (to the extent that communication can be performed between the inside and the outside of the vehicle cabin). The short-range communication unit 103 performs, for example, BLE-based data communication. The BLE is a low electric power communication standard based on the Bluetooth (registered trademark), and is characterized in that communication can be immediately initiated by opponent detection and no device-to-device pairing is needed.

The controller 104 performs short-range wireless communication with the agent terminal 200B via the short-range communication unit 103 and performs control for authenticating the agent terminal 200B and control for transmitting the lock and unlock signal based on the result of the authentication. The controller 104 includes, for example, a processor and a memory. The processor realizes various functions by executing a control program stored in the memory for controlling the key unit 100. The controller 104 realizes, for example, a function to receive, via the LF receiver 101, a polling signal transmitted as a radio wave in the LF band from the locking and unlocking device 300, a function to transmit the lock and unlock signal as a radio wave in the RF band to the locking and unlocking device 300 via the RF transmitter 102, a function to process communication with the agent terminal 200B performed via the short-range communication unit 103, and a function to generate the lock and unlock signal in a case where the authentication of the agent terminal 200B is successful.

The controller 104 performs authentication processing for the agent terminal 200B based on the authentication information included in a lock request or an unlock request (hereinafter, collectively referred to as a lock and unlock request) transmitted from the agent terminal 200B. The controller 104 compares the authentication information stored in the memory with the authentication information transmitted from the agent terminal 200B, and determines that the authentication is successful in a case where a predetermined relationship is recognized in the two authentication information pieces. The controller 104 determines that the authentication is unsuccessful in a case where the predetermined relationship is not recognized. In a case where the authentication of the agent terminal 200B is successful, a lock and unlock signal generated in response to a request received from the agent terminal 200B is transmitted to the locking and unlocking device 300 via the RF transmitter 102. The method for the authentication may be an identity verification method based on simple authentication information comparison or an asymmetric encryption-based method. In the following description, the authentication information stored in the key unit 100 will be referred to as device authentication information and the authentication information transmitted from the agent terminal 200B will be simply referred to as authentication information as needed for description.

The key unit 100 transmits the ID of the electronic key (hereinafter, referred to as a key ID) to the locking and unlocking device 300 along with the lock and unlock signal. The key ID may be stored in advance in the key unit 100 in a plaintext state or may be stored in an encrypted state.

The agent terminal 200B will be described below. The agent terminal 200B functions as a device performing operations and processing as a short-range communication unit 201, a communication unit 202, a controller 203, and an input and output unit 204 by the processor 21 loading and executing a program stored in the storage device 22. The short-range communication unit 201 corresponds to the short-range wireless communication circuit 27, and communicates with the key unit 100 by means of the same communication standard as that of the short-range communication unit 103. The communication unit 202 corresponds to the wireless communication circuit 23, connects the agent terminal 200B to the network 1, and administers communication with the management device 400 and so on. The communication unit 202 communicates with another device (such as the management device 400) via the network 1 by using a mobile communication service such as 3G and LTE.

The controller 203 corresponds to the processor 21. The controller 203 performs, for example, processing for lock and unlock request generation, processing for acquiring the above-described authentication information, and processing for transmitting the lock and unlock request and the authentication information to the key unit 100. The controller 203 performs processing for rewriting the control program stored in the memory of the key unit 100 as described later as well as the processing described above. The controller 203 interacts with the agent via the input and output unit 204. The input and output unit 204 corresponds to the input device 24 and the display 25, receives an input operation performed by the agent, and presents information with respect to the agent.

The controller 203 displays an operation screen on the input and output unit 204 and generates an unlock request or a lock request in accordance with an operation performed by the agent. For example, the controller 203 outputs an icon for unlocking, an icon for locking, and the like on a touch panel display, and generates an unlock request or a lock request based on an operation performed by the agent. The operation performed by the agent is not limited to those via the touch panel display. For example, it may be a hardware switch-based one as well.

The controller 203 performs processing for acquiring authentication information from the management device 400. The authentication information is not for authentication of the key unit 100 by the locking and unlocking device 300. The authentication information is for authentication of the agent terminal 200B by the key unit 100. Specifically, the controller 203 transmits, to the management device 400 via the communication unit 202, a signal for requesting authentication information issuance along with information for identification of the agent terminal 200B. Upon receiving the signal, the management device 400 acquires authentication information unique to the agent terminal 200B and transmits the acquired authentication information to the agent terminal 200B. As a result, an operation for unlocking the vehicle 10 can be performed on the agent terminal 200B. In a case where the agent terminal 200B has no authentication information, a lock operation and an unlock operation from an operation screen are impossible. The authentication information acquired by the agent terminal 200B may be an immutable key or a one-time key. In either case, the device authentication information corresponding to the authentication information is stored in advance in the key unit 100.

Invalidation (Release of Operation Enablement State of Vehicle 10)

Release of the operable state of the vehicle 10 by the agent is performed as follows. For example, the management device 400 invalidates the authentication information issued to the agent terminal 200B. The specific content of the authentication information invalidation processing is not particularly limited insofar as it is possible that the agent cannot re-operate the vehicle 10 with the agent terminal 200B after parking completion.

The invalidation of the authentication information can be realized by, for example, the management device 400 performing the following processing. However, any method other than the above can be applied as an invalidation method insofar as the agent cannot unlock and drive the vehicle again after parking assistance by the agent is completed. (1) An instruction for authentication information deletion is given to the agent terminal 200B. (2) An instruction for setting an authentication information invalid flag is given to the agent terminal 200B. In this case, the agent terminal 200B is put into a state of transmitting no authentication information while the invalid flag is set. (3) An instruction is given to the agent terminal 200B for the expiration date of the authentication information to be rewritten to a past date and time. The agent terminal 200B deletes the authentication information with an already passed expiration date. (4) An instruction that the authentication information is invalid and transmission of invalid authentication information is prohibited is given to the agent terminal 200B. (5) The management device 400 communicates with the key unit 100 and gives the key unit 100 an instruction that the authentication information is invalid and unacceptable. (6) The management device 400 communicates with the key unit 100 and gives the key unit 100 an instruction to the effect that the authentication information from the agent terminal 200B is unacceptable with respect to the vehicle 10. (7) Also conceivable is manual authentication information deletion from the agent terminal 200B without communication by the management device 400.

First Modification Example of Locking and Unlocking System

In the above-described example of the locking and unlocking system, an example in which the vehicle 10 is unlocked by the locking and unlocking device 300 in a case where the authentication processing is successful in the key unit 100 has been described. Alternatively, the processing in the key unit 100 may be executed in the locking and unlocking device 300. In other words, the locking and unlocking device 300 may include an electronic control unit (ECU) for authenticating the authentication information received from the agent terminal 200B and the electronic control unit may transmit an unlock command or a lock command to the body ECU 304 via an in-vehicle network such as a CAN when the authentication of the agent terminal 200B is successful. With the above configuration, the agent can operate the vehicle 10 in a simple configuration without the key unit 100.

Second Modification Example of Locking and Unlocking System

In the above-described example of the locking and unlocking system, the lock and unlock signal is transmitted from the key unit 100 to the locking and unlocking device 300 and the vehicle 10 is locked and unlocked when the agent terminal 200B receives the authentication information as enablement data for the vehicle 10 from the management device 400 and the agent terminal 200B is authenticated based on the authentication information. However, the authentication information may include key ID information for unlocking and locking of the vehicle 10 without being information for authentication of the agent terminal 200B. In this case, the agent terminal 200B receives the authentication information including the key ID from the management device 400 and transmits the received key ID to the locking and unlocking device 300 along with the lock and unlock signal. The locking and unlocking device 300 collates the received key ID with the key ID pre-stored in the locking and unlocking device 300, and locks and unlocks the vehicle 10 when the key IDs match. The key ID may be transmitted and received in an encrypted state between the agent terminal 200B and the management device 400 or the locking and unlocking device 300. For example, the management device 400 may generate a one-time key by encrypting the key ID with a predetermined algorithm along with time information. In the locking and unlocking device 300, the received one-time key may be decrypted by a method corresponding to the same predetermined algorithm as that of the management device 400 and collated with the key ID pre-stored in the locking and unlocking device 300. The one-time key may be transmitted from the management device 400 to a lending management server (not illustrated) and may be transmitted from the lending management server to the agent terminal 200B. In any case, the agent terminal 200B makes an invalidation attempt by deleting the one-time key when a predetermined time elapses from one-time key receipt. By the one-time key generated from the time information and the key ID being included in the authentication information, the management device 400 is capable of temporarily generating valid authentication information at each time of parking assistance and transmitting the information to the agent terminal 200B.

Third Modification Example of Locking and Unlocking System

In the above-described example of the locking and unlocking system, the management device 400 may transmit the authentication information for the agent terminal 200B corresponding to fixed authentication information unique to the key unit 100 to the agent terminal 200B or transmit the key ID pre-stored in the locking and unlocking device 300 of the vehicle 10. Alternatively, the management device 400 may generate new authentication information and issue it to the agent terminal 200B every time an authentication information request is received from the agent terminal 200B. In this case, the management device 400 may store the device authentication information for the key unit 100 corresponding to the new authentication information for the agent terminal 200B in the key unit 100 via an in-vehicle communication device (not illustrated) capable of communicating with the network 1 to which the agent terminal 200B is connected. In this case, the key unit 100 may be connected to the in-vehicle communication device via a CAN or the like. Alternatively, the management device 400 may generate new authentication information based on identification information for identification of the vehicle 10 and time information and may deliver the new authentication information and the time information to the agent terminal 200B. In this case, the key unit 100 may also generate new authentication information by a method corresponding to the same algorithm as that of the management device 400. The agent terminal 200B may transmit the new authentication information and the time information to the key unit 100 for authentication.

Effect of Embodiment

According to the embodiment, the management device 400 receives the position information on the vehicle 10 from the agent terminal 200B and transmits (provides) the path information to (for) the user terminal 200A, the path information indicating the movement path of the vehicle 10 between the delivery place for the vehicle 10 and the parking lot based on the position information. The user terminal 200A displays, on the display 25, the path information acquired from the management device 400. As a result, the user terminal 200A presents the path information to the service user. As a result, the service user can be aware of the path along which the vehicle 10 has moved to the parking lot by assisted driving, and can be aware of the type of the path along which the vehicle 10 has been moved to the parking lot. Accordingly, concerns over the vehicle 10 arriving at the parking lot by traveling along a path deemed useless or unnecessary and energy needed for a movement being wasted by traveling along an unnecessary path can be addressed, and the service user can feel at ease. The service user is likely to repeat the use of the service as he or she feels at ease. As the path information provision spreads, the service user can wish, at ease, for a service use contract. In other words, the service user's contract-related decision making can be facilitated.

By the path information 1 to the path information 3 described with reference to FIG. 13 being provided as the path information, the service user can grasp the path with ease and usability improvement can be achieved. The position information on the vehicle 10 can be obtained by means of a facility of the vehicle 10 (car navigation device or drive recorder). When the position information is acquired by means of the user terminal 200A, concerns can be addressed over the agent operating a facility of the vehicle 10 without the service user's awareness.

Information indicating an evaluation on the path information can be transmitted from the user terminal 200A to the management device 400. Path-related evaluation values and opinions can be expressed, and a complaint can be expressed in the event of an unsatisfactory value or opinion. As a result, improvement can be expected, the service user can feel more relief and satisfaction, and usability improvement can be achieved.

Modification Example of Management Device and Others

Figure 16:
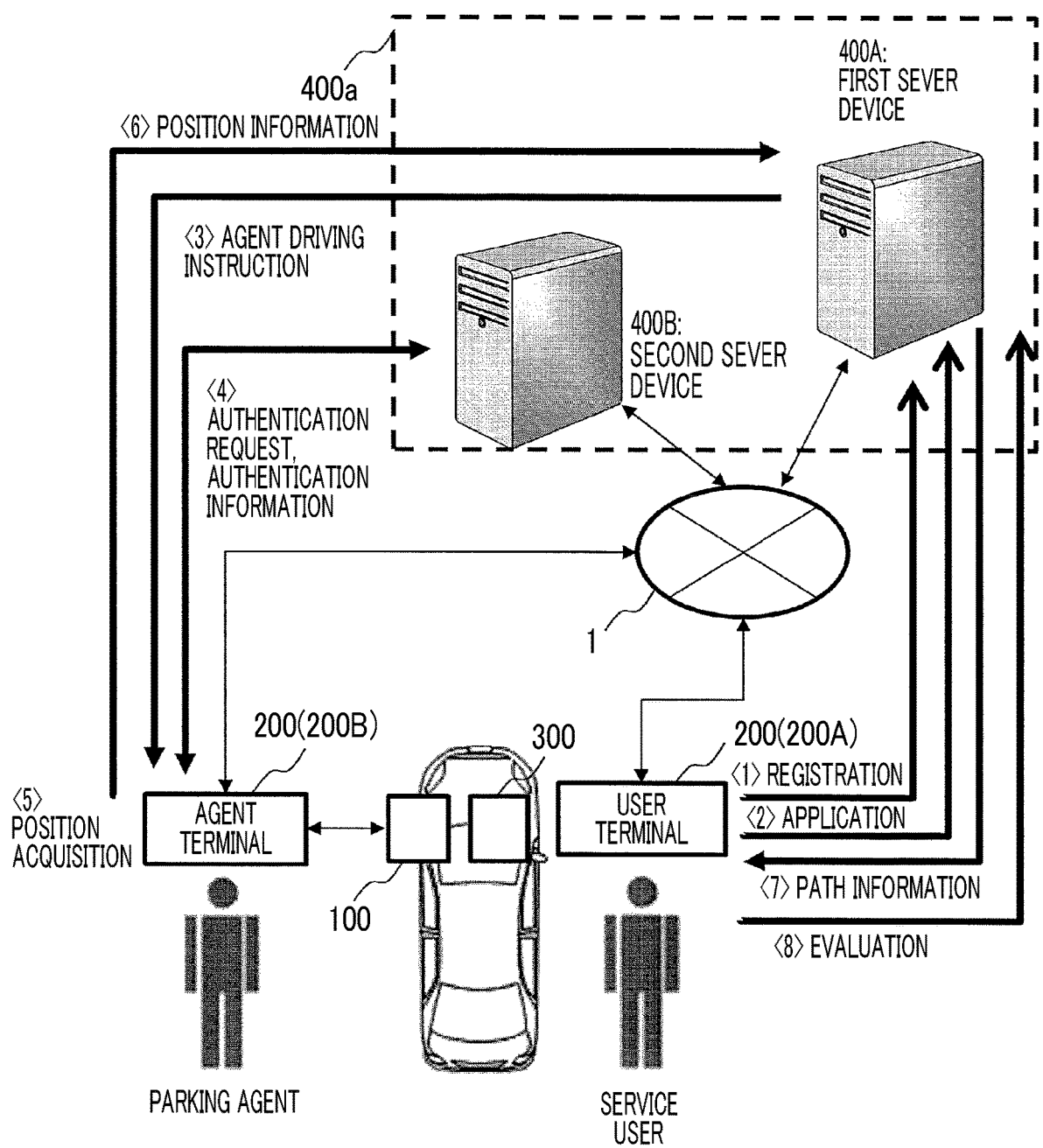
FIG. 16 is a diagram illustrating a modification example of the management device.

FIG. 16 is a diagram illustrating a modification example of the management device 400 illustrated in FIG. 1. A management device 400a illustrated in FIG. 16 is a device including a first server device 400A and a second server device 400B. The first server device 400A performs processing for operating as a parking assistance service management device among the processing performed by the management device 400a. The second server device 400B performs processing for operating as an authentication information issuing device among the processing performed by the management device 400a.

In <3> in FIG. 16, the first server device 400A includes information indicating a method for accessing the second server device 400B, such as the address of the second server device 400B, in the agent driving instruction transmitted to the agent terminal 200B. The agent terminal 200B sends an authentication information issuing request to the second server device 400B by using the address of the second server device 400B. The second server device 400B issues authentication information in response to the issuing request and sends the information to the agent terminal 200B (<4> in FIG. 16).

According to the modification example of the management device, the processing of the management device 400a is distributed to the first server device 400A and the second server device 400B to the extent that no burden arises on the service user's or agent's part, and thus load dispersion can be achieved for service user management and authentication information management. The user terminal 200A does not access the second server device 400B having authentication information, and thus different security levels can be adopted for the first server device 400A and the second server device 400B. For example, it is conceivable to loosen the security level of the first server device 400A as compared with that of the second server device 400B to reduce the processing and time needed for an interaction with the user terminal 200A.

In the embodiment described above, a configuration has been described in which the key unit 100 is operated as an electronic key by means of the agent terminal 200B. The parking assistance service according to the embodiment described above can be implemented even when the vehicle of the service user is a vehicle in which the key unit 100 is not mounted. In this case, vehicle (physical key) delivery may be directly performed between the service user and the agent. The configuration according to the embodiment described above can be appropriately combined.

What is claimed is:

1. A parking assistance service management device that manages a parking assistance service in which an agent provides parking assistance for a vehicle of a service user, the parking assistance service management device comprising:
    a processor configured to acquire position information on the vehicle from a terminal of the agent driving the vehicle to a parking lot on behalf of the service user, and the processor being configured to generate, based on the position information, information indicating a path along which the vehicle has traveled to the parking lot from a delivery place at which the vehicle is delivered to the agent; and
    a transmission unit configured to transmit the information indicating the path to a terminal of the service user,
    wherein the processor is configured to acquire, from the terminal of the service user, information indicating service user's evaluation on the information indicating the path.

2. The parking assistance service management device according to claim 1, wherein the information indicating the path includes information indicating a road and an intersection through which the vehicle has traveled.

3. The parking assistance service management device according to claim 1, wherein the information indicating the path includes an image of an outside of the vehicle captured from the vehicle when the vehicle is travelling to the parking lot.

4. The parking assistance service management device according to claim 1, wherein the delivery place is a place at which the vehicle is delivered to the agent from the service user.

5. The parking assistance service management device according to claim 1, wherein the parking assistance service includes the agent parking the vehicle for the service user.

6. A parking assistance service use support method for managing a parking assistance service in which an agent provides parking assistance for a vehicle of a service user, the parking assistance service use support method comprising:
    acquiring position information on the vehicle from a terminal of the agent driving the vehicle to a parking lot on behalf of the service user;
    generating, based on the position information, information indicating a path along which the vehicle has traveled to the parking lot from a delivery place at which the vehicle is delivered to the agent;
    transmitting the information indicating the path to a terminal of the service user; and
    acquiring, from the terminal of the service user, information indicating service user's evaluation on the information indicating the path.

7. A non-transitory computer-readable storage medium storing a program for managing a parking assistance service in which an agent provides parking assistance for a vehicle of a service user, the program causing a computer of a management device that manages the parking assistance service to execute
    a step of acquiring position information on the vehicle from a terminal of the agent driving the vehicle to a parking lot on behalf of the service user;
    a step of generating, based on the position information, information indicating a path along which the vehicle has traveled to the parking lot from a delivery place at which the vehicle is delivered to the agent;
    a step of transmitting the information indicating the path to a terminal of the service user; and
    a step of acquiring, from the terminal of the service user, information indicating service user's evaluation on the information indicating the path.

* * * * *